United States Patent
Fox

(10) Patent No.: US 7,374,028 B2
(45) Date of Patent: May 20, 2008

(54) DAMPER WITH PRESSURE-SENSITIVE COMPRESSION DAMPING

(75) Inventor: Robert C. Fox, Los Gatos, CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

(21) Appl. No.: 11/261,051

(22) Filed: Oct. 27, 2005

(65) Prior Publication Data

US 2006/0289258 A1    Dec. 28, 2006

Related U.S. Application Data

(63) Continuation of application No. PCT/US2004/038661, filed on Nov. 18, 2004, which is a continuation of application No. 10/661,334, filed on Sep. 12, 2003, now abandoned.

(60) Provisional application No. 60/485,485, filed on Jul. 8, 2003.

(51) Int. Cl.
*F16F 9/34* (2006.01)

(52) U.S. Cl. .................. 188/322.14; 188/322.13; 188/322.15

(58) Field of Classification Search ........... 188/322.14, 188/322.21, 321.11, 322.19, 322.13, 322.15, 188/316, 317, 313, 314, 318, 297, 304; 267/64.11, 267/64.14, 64.28
See application file for complete search history.

(56) References Cited

U.S. PATENT DOCUMENTS

| | | | |
|---|---|---|---|
| 1,724,423 A | 8/1929 | Saives | |
| 2,255,181 A | 9/1941 | Newton | |
| 2,310,570 A | 2/1943 | Briggs | |
| 2,698,068 A | 12/1954 | Heinz | |
| 2,771,968 A | 11/1956 | Mercier | |
| 3,040,841 A | 6/1962 | Schultze | |
| 3,086,622 A | 4/1963 | Schultze | |
| 3,256,960 A | 6/1966 | Casimir | |
| 3,421,606 A | 1/1969 | Cadiou | |
| 3,522,941 A | 8/1970 | Biabaud | |
| 3,621,950 A | 11/1971 | Lutz | |
| 3,762,514 A | 10/1973 | Freitag | |
| 3,945,626 A | 3/1976 | Tilkens | |
| 4,084,667 A | 4/1978 | Kurrat | |
| 4,106,596 A | 8/1978 | Hausmann | |

(Continued)

FOREIGN PATENT DOCUMENTS

CA    2298291    8/2004

(Continued)

OTHER PUBLICATIONS

R. T. Schneider, "What You Should Know About Pressure Intensifiers", Hydraulics and Pneumatics, Jun. 1978 (pp. 64-67).

*Primary Examiner*—Pam Rodriguez
(74) *Attorney, Agent, or Firm*—Patterson & Sheridan, L.L.P.

(57) ABSTRACT

A self-pressurized damper, for example, a pressure-sensitive damper is described. At least one suspension spring is used to pressurize the damping fluid, a task typically carried out by a sealed moveable barrier, such as an internal floating piston (IFP) and a pressurized gas. Thus, stroke length may be maximized. Furthermore, the amount of compression damping force produced by the damper may be a function of the force generated by the at least one suspension spring.

25 Claims, 23 Drawing Sheets

U.S. PATENT DOCUMENTS

| | | | |
|---|---|---|---|
| 4,159,105 A | 6/1979 | Vander Laan |
| 4,226,408 A | 10/1980 | Tomita |
| 4,325,541 A | 4/1982 | Korosladanyi |
| 4,407,396 A | 10/1983 | Sirven |
| 4,491,207 A | 1/1985 | Boonchanta |
| 4,515,253 A | 5/1985 | Itoh |
| 4,561,524 A | 12/1985 | Mizumakai |
| 4,653,617 A | 3/1987 | Casimir |
| 4,683,992 A | 8/1987 | Watanabe |
| 4,749,068 A | 6/1988 | Sirven |
| 4,795,009 A | 1/1989 | Tanahashi |
| 4,802,561 A | 2/1989 | Knecht |
| 4,830,395 A | 5/1989 | Foley |
| 4,834,088 A | 5/1989 | Jeanson |
| 4,858,898 A | 8/1989 | Niikura |
| 4,936,424 A | 6/1990 | Costa |
| 5,042,625 A | 8/1991 | Maus |
| 5,046,755 A | 9/1991 | Runkel |
| 5,098,120 A | 3/1992 | Hayashi |
| 5,129,488 A | 7/1992 | Furuya |
| 5,190,126 A | 3/1993 | Curnutt |
| 5,207,300 A | 5/1993 | Engel |
| 5,259,487 A | 11/1993 | Petek |
| 5,346,042 A | 9/1994 | Paskus |
| 5,392,885 A | 2/1995 | Patzenhauer |
| 5,400,880 A | 3/1995 | Ryan |
| 5,533,596 A | 7/1996 | Patzenhauer |
| 5,538,276 A | 7/1996 | Tullis |
| 5,913,391 A | 6/1999 | Jeffries |
| 5,954,167 A | 9/1999 | Richardson |
| 6,079,526 A | 6/2000 | Nezu |
| 6,135,434 A | 10/2000 | Marking |
| 6,161,662 A | 12/2000 | Johnston |
| 6,182,687 B1 | 2/2001 | Forster |
| 6,206,152 B1 | 3/2001 | Grundei |
| 6,213,263 B1 | 4/2001 | De Frenne |
| 6,254,067 B1 | 7/2001 | Yih |
| 6,296,092 B1 | 10/2001 | Marking |
| 6,305,512 B1 | 10/2001 | Heinz |
| 6,311,962 B1 | 11/2001 | Marking |
| 6,318,525 B1 | 11/2001 | Vignocchi |
| 6,322,058 B1 | 11/2001 | Tanigawa |
| 6,332,622 B1 | 12/2001 | Nakamura |
| 6,415,895 B2 | 7/2002 | Marking |
| 6,427,986 B1 | 8/2002 | Sakai |
| 6,450,304 B1 | 9/2002 | Miller |
| 6,527,093 B2 | 3/2003 | Oliver |
| 6,540,051 B2 | 4/2003 | Grundei |
| 6,581,948 B2 | 6/2003 | Fox |
| 6,592,136 B2 | 7/2003 | Becker |
| 6,604,751 B2 | 8/2003 | Fox |
| 6,673,117 B1 | 1/2004 | Soss |
| 6,938,887 B2 | 9/2005 | Achenbach |
| 6,978,872 B2 | 12/2005 | Turner |
| 7,128,192 B2 | 10/2006 | Fox |
| 7,163,222 B2 | 1/2007 | Becker |
| 2001/0040078 A1 | 11/2001 | Gonzlez |
| 2002/0108827 A1 | 8/2002 | Oliver |
| 2002/0175035 A1 | 11/2002 | Achenbach |
| 2003/0213662 A1 | 11/2003 | Fox |
| 2004/0159515 A1 | 8/2004 | Bell |
| 2004/0222056 A1 | 11/2004 | Fox |
| 2005/0087953 A1 | 4/2005 | Becker |
| 2005/0178626 A1 | 8/2005 | Turner |
| 2006/0065496 A1 | 3/2006 | Fox |
| 2006/0090973 A1 | 5/2006 | Potas |
| 2007/0012531 A1 | 1/2007 | Fox |

FOREIGN PATENT DOCUMENTS

| | | |
|---|---|---|
| DE | 1163693 | 2/1964 |
| DE | 1229789 | 12/1966 |
| DE | 1430051 | 10/1968 |
| DE | 1430382 | 12/1968 |
| DE | 1505497 | 9/1969 |
| DE | 1580552 | 10/1970 |
| DE | 1575191 | 8/1974 |
| DE | 2359690 | 9/1983 |
| DE | 3228694 | 2/1984 |
| DE | 2322997 | 5/1985 |
| DE | 3519483 | 12/1985 |
| DE | 8416704 | 1/1986 |
| DE | 3320993 | 1/1987 |
| DE | 3528830 | 2/1987 |
| DE | 3619402 | 10/1988 |
| DE | 3829966 | 3/1990 |
| DE | 1600839 | 4/1990 |
| DE | 3913912 | 10/1990 |
| DE | 4017925 | 12/1991 |
| DE | 9202402.5 | 6/1992 |
| DE | 9205435 | 8/1992 |
| DE | 3844862 | 4/1994 |
| EP | 0 409 094 A | 1/1991 |
| EP | 0430368 | 6/1991 |
| EP | 1 058 027 A | 12/2000 |
| EP | 1096171 | 5/2001 |
| EP | 1191251 | 3/2002 |
| EP | 1231404 | 8/2002 |
| FR | 0872167 | 6/1942 |
| FR | 1165327 | 10/1958 |
| FR | 1272159 | 8/1961 |
| FR | 1510677 | 1/1968 |
| FR | 1531475 | 7/1968 |
| FR | 1532320 | 7/1968 |
| FR | 2559716 | 8/1985 |
| FR | 2594076 | 8/1987 |
| FR | 2608519 | 6/1988 |
| GB | 1280688 | 7/1972 |
| GB | 2180320 | 3/1985 |
| GB | 2282864 | 4/1985 |
| GB | 2151746 | 7/1985 |
| GB | 2155584 | 9/1985 |
| GB | 2161892 | 1/1986 |
| GB | 2189004 | 10/1987 |
| GB | 2196092 | 4/1988 |
| JP | 60-038220 | 2/1985 |
| WO | WO 03/102425 A | 12/2003 |
| WO | WO03102426 | 12/2003 |
| WO | WO2006054994 | 5/2006 |
| WO | WO2006065235 | 6/2006 |

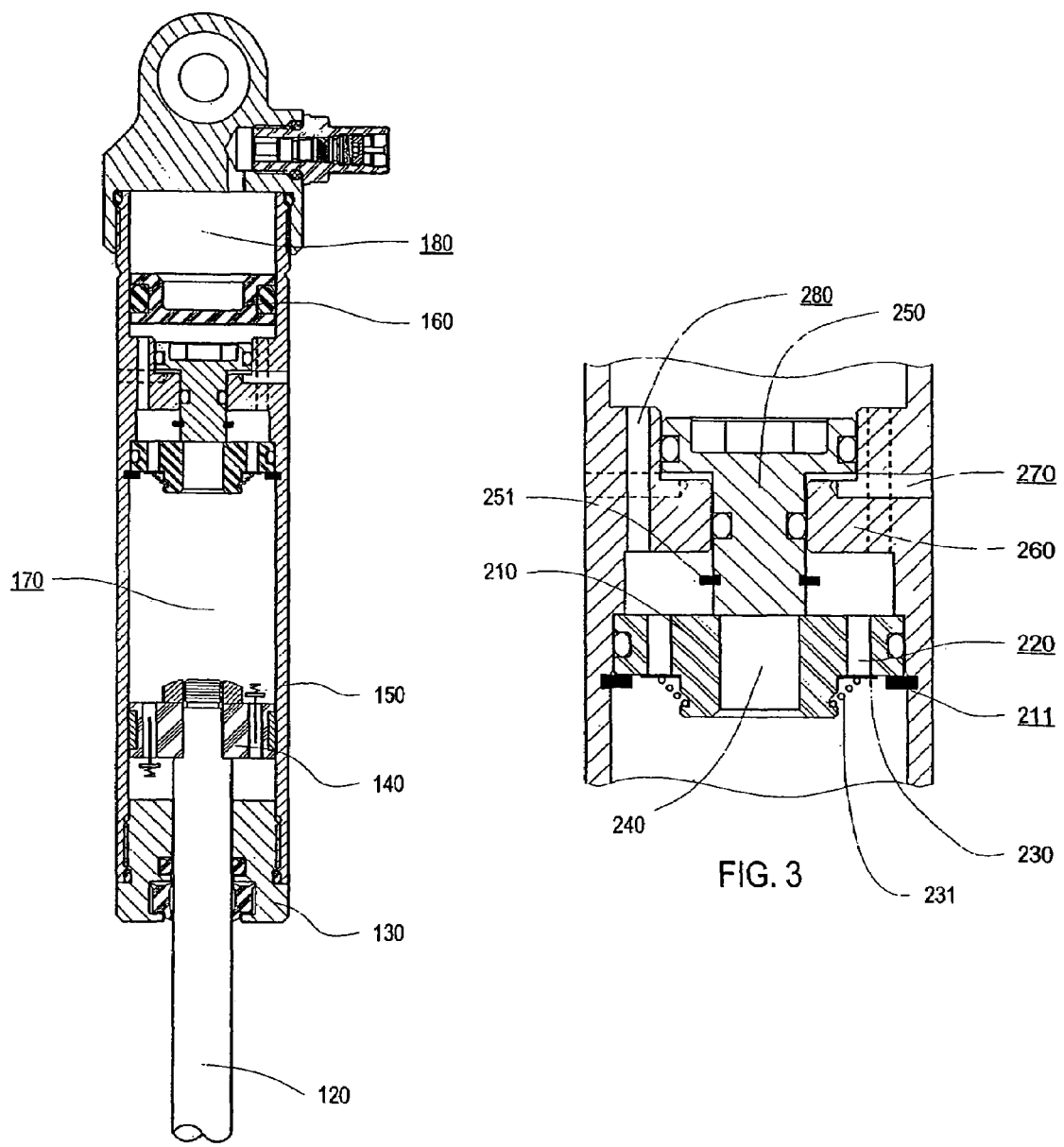

SEC. A-A

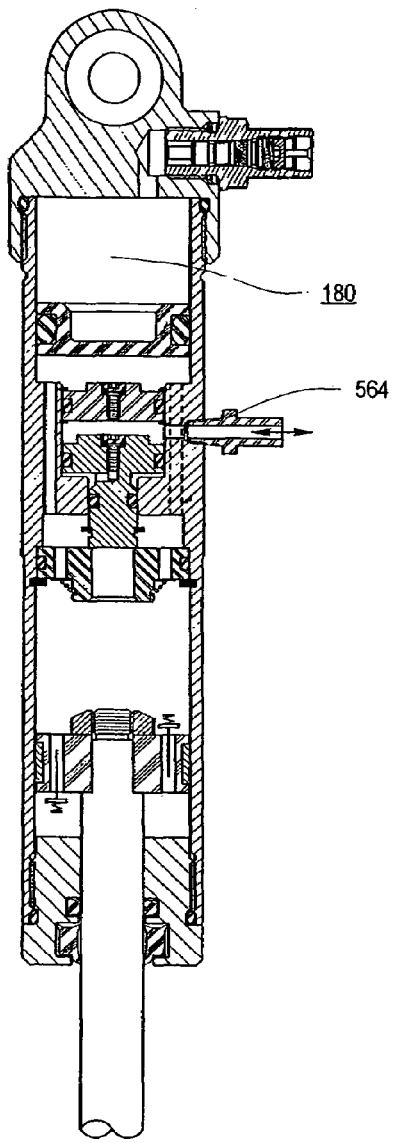
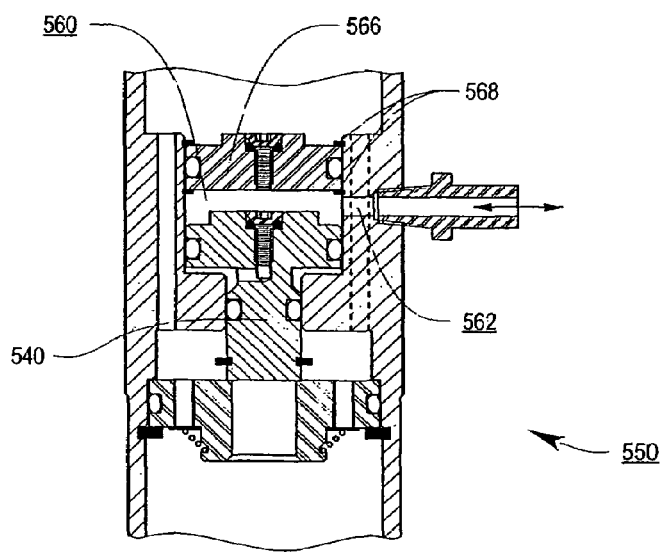
FIG. 19
FIG. 18

SEC. A-A

DAMPER WITH PRESSURE-SENSITIVE COMPRESSION DAMPING

RELATED APPLICATIONS

This application is a continuation of International Application No. PCT/US2004/038661, filed 18 Nov. 2004, which is a continuation of U.S. application Ser. No. 10/661,334 (now abandoned), filed 12 Sep. 2003, which claims priority to Provisional Application No. 60/485,485, filed 8 Jul. 2003, the entireties of which are hereby incorporated by reference herein and made a part of this specification.

BACKGROUND OF INVENTION

1. Field of Invention

This invention relates to a damper and, more particularly, to a damper suitably used as a shock absorber or front fork on the suspension of a bicycle, motorcycle, automobile or other vehicle.

2. Description of Related Art

Dampers (shock absorbers, MacPherson struts, front forks, etc.) for controlling vehicle body motion and handling characteristics during vehicle travel over uneven surface are well-known in the art. Dampers typically comprise a closed hydraulic cylinder with an internal piston connected to a central piston rod, which reciprocates within the cylinder to produce damping forces.

As is well known in the art, the damping forces created by a damper have a major influence on the overall dynamic performance of a vehicle. A wide range of dynamic conditions are encountered during typical vehicle motion over various surfaces and terrain features. For example, these features and conditions include large and small bumps, sharp-edged bumps and round-edged bumps, close-spaced bumps and widespaced bumps, stutter bumps and gradual undulating bumps, and so forth. In addition, conditions include vehicle acceleration and deceleration modes, uphill and downhill travel modes, as well as turning modes.

Besides the factors noted above, different operators of a specific vehicle traversing identical terrain features often prefer significantly different damping characteristics. This is especially true for light-weight vehicles, such as bicycles or motorcycles, where rider weight can be a major portion of total weight, and where rider "style" or "technique" can have a significant influence on overall suspension performance.

As a result of the wide variety of dynamic conditions and individual factors which a vehicle damper responds to, as noted above, it is desirable to provide means for adjusting damping forces to suit particular situations. As is known in the art, damping forces of many dampers can be altered by disassembling the damper and changing internal parts. Also, as is known in the art, various mechanisms have been developed over the years for quickly adjusting damping forces externally, without disassembly of the damper, for example by pre-setting an adjustable knob on the damper.

For example, Fox et al U.S. Pat. No. 6,360,857 teaches a mechanism for externally adjusting damping forces.

In addition to providing for alteration of damping forces via pre-set external adjustments, various constructions have also been taught in the damper art to provide remote adjustment, as well as dynamic, automatic modulation of damping forces based on sensing and reacting to internal or external conditions or inputs.

One example of dynamic modulation of damping forces based on sensing and reacting to internal conditions, common to most conventional dampers, is the velocity-sensitive characteristic, wherein damping forces generally increase as the velocity of the piston increases (there are, however, wide variations in the force-vs-velocity curve shapes and force levels found in various dampers calibrated for specific applications and conditions).

An example of a construction for modulating damping force based on sensing an external condition is shown in the Hein U.S. Pat. No. 2,698,068. In the Hein patent, a damper is shown which includes hydraulic communication from the vehicle braking system to a passage down the center of the piston rod which leads to a valving arrangement in the damping piston. In operation, application of the vehicle brakes acts on the compression valving to provide an "anti-dive" effect at the front of the vehicle. One drawback of this construction is that it is only capable of reacting to one specific condition, the application of the vehicle brakes.

An example of a construction for modulating damping force based on dynamically reacting to an external input is shown in the Engel U.S. Pat. No. 5,207,300. In the Engel patent, a damper is shown which includes an external pressure source input which communicates via a central passage through the piston rod to a valving arrangement in the damping piston which includes a vented pressure intensifier. In operation, variations in the pressure applied by the external source produce dynamic variations in the damping characteristics of the damper. Drawbacks of this construction include its relative complexity and cost, as well as blocked availability to the central passage down the piston rod, which could otherwise be utilized for inclusion of alternate pre-set adjustment mechanisms in communication with the damping piston.

Another example of a construction for automatically modulating damping force based on sensing and reacting to internal conditions is shown in the patent to Curnutt, U.S. Pat. No. 5,190,126.

In the Curnutt patent, a damper is shown which includes a conventional cylinder and a piston rod with an attached first piston which divides the interior of the cylinder into two chambers. Fluid flow through the first piston is controlled by an adjoining, pressure-sealed second piston which is driven by pressure differentials to move relative to the first piston. Motion of the second piston relative to the first piston blocks or unblocks flow passages in the first piston, thus creating the compression damping forces produced. One drawback of this construction is that it produces a relatively "flat" force vs. velocity compression damping curve (a "blow-off" type of damping characteristic), which can be difficult to tune for specific applications and conditions.

The present invention was developed to provide an improved damper which provides automatic modulation of damping forces based on sensing and reacting to internally-generated or externally-generated conditions, and that avoids the above and other drawbacks of the known prior art.

BRIEF DESCRIPTION OF THE DRAWINGS

FIG. 2 is a sectional front view of the prior-art damper of FIG. 1 modified in accordance with an exemplary embodiment of the present invention.

FIG. 3 is an enlarged partial sectional front view of the damper of FIG. 1, showing the added structure of this embodiment of the present invention.

FIG. 18 is a sectional front view of the prior-art damper of FIG. 1 modified in accordance with a seventh exemplary embodiment of the present invention.

FIG. 19 is an enlarged partial sectional front view of the damper of FIG. 18, showing the added structure of this embodiment of the present invention.

DETAILED DESCRIPTION OF THE EXEMPLARY EMBODIMENTS

The prior-art damper 100 of FIG. 1 will be described first, in order to provide a point of departure for better understanding the improvements of the present invention, which will be described further on. It is to be understood, of course, that this specific prior-art embodiment is representative only, and that the embodiments disclosed herein may be applied to other types of dampers.

Figure 1:
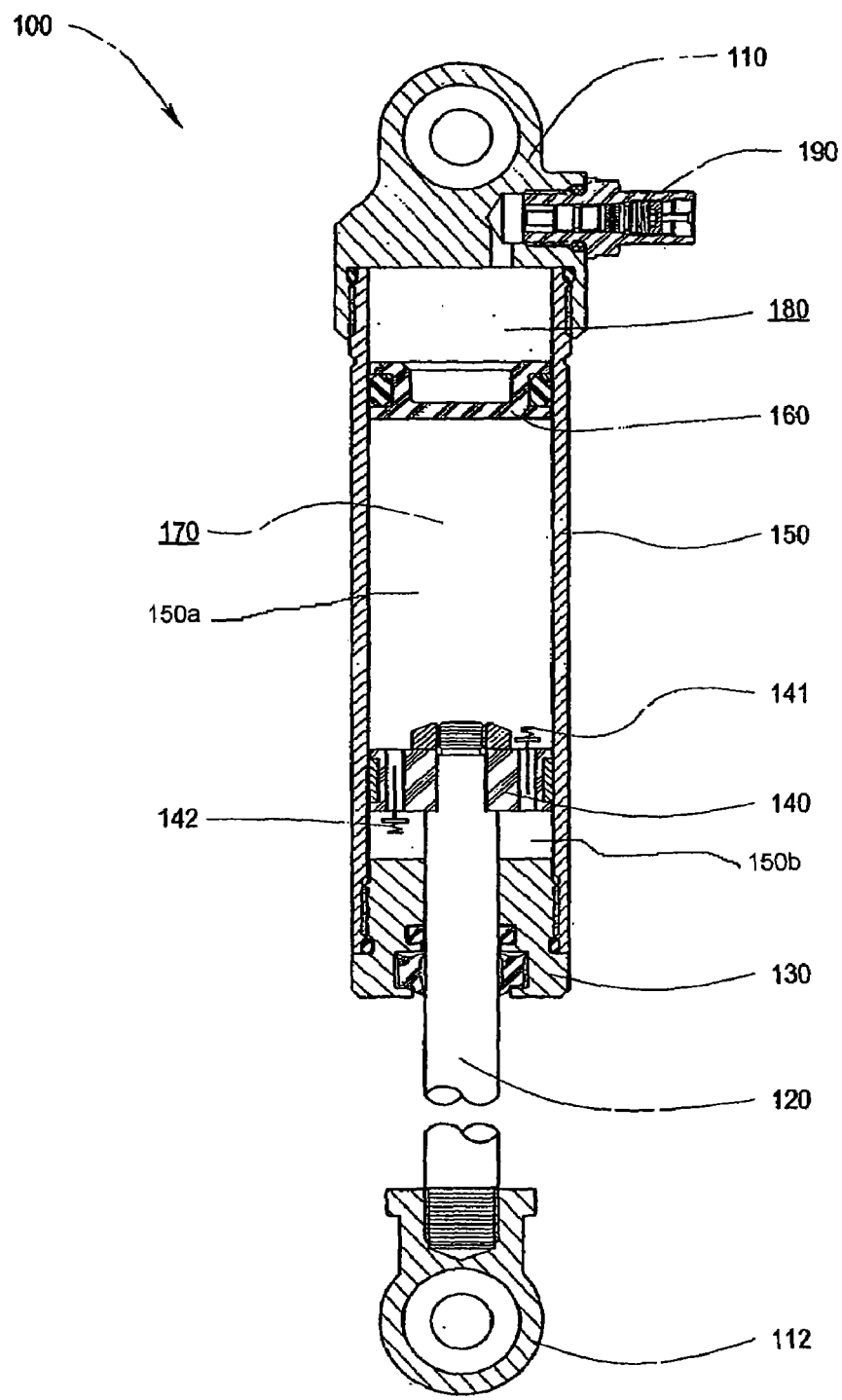
FIG. 1 is a sectional front view of a prior-art embodiment of a pressurized damper unit.

In FIG. 1 the prior-art damper 100, as is known to those skilled in the art, is comprised of an upper eyelet 110 and a lower eyelet 112 for attachment to, for example, the sprung and un-sprung portions of a vehicle (not shown). The lower eyelet 112 is connected to the piston rod 120 which passes through the seal head 130 and has a damping piston 140 attached at the other end. The damping piston 140 reciprocates in the damper cylinder 150 as the sprung and unsprung portions of the vehicle move relative to each other when, for example, the vehicle traverses uneven terrain. The damping piston 140 has rebound valving 141 (shown symbolically here) and compression valving 142 (also shown symbolically) for restricting fluid flow during rebound strokes (lengthening) and compression strokes (shortening). The valving produces damping forces that resist the imposed motion. Many different valving structures, for example flexible stacks of disc valves covering flow ports through the damping piston 140, suitable for a variety of applications and condition, are known in the art.

Still referring to FIG. 1, the damper cylinder 150 is sealed at one end by the seal head 130 and at the other end by the upper eyelet 110. A floating piston 160 is sealingly engaged, but free to reciprocate, toward the upper end of the damper cylinder 150. The floating piston 160 separates the hydraulic fluid 170 below it from the internally-pressurized chamber 180 above it, which contains a pressurized gas (for example, nitrogen or air). The Schrader valve 190 provides access to the internally-pressurized chamber 180, which forms a pressure source.

The damping piston 140 divides the total amount of hydraulic fluid 170 contained in the damper cylinder 150 into two portions: a portion above the damping piston 140 (i.e., compression chamber 150*a*), and a portion below it (i.e., rebound chamber 150*b*). When the damping piston 140 moves upward in the damper cylinder 150 (a compression stroke) some of the hydraulic fluid 170 in the compression chamber 150*a* flows downward through the damping piston 140, via the compression valving 142, into rebound chamber 150*b*. The compression valving 142 restricts this flow, creating compression damping.

When the damping piston 140 moves downward in the damper cylinder 150 (a rebound stroke) some of the hydraulic fluid 170 below the damping piston 140 must flow upward through the damping piston 140, via the rebound valving 141, into the area above the damping piston 140. The rebound valving 141 restricts this flow, creating rebound damping.

In order to understand the operation of the exemplary embodiments, it is also important to clearly understand the movement of the floating piston 160, and of the hydraulic fluid 170 below it, during an inward or outward movement of the piston rod 120. Specifically, it is important to understand the flow of hydraulic fluid 170 that occurs due to the additional volume displaced by the piston rod 120 as it enters the damper cylinder 150, as well as the flow that occurs due to the volume vacated by the piston rod 120 as it is withdrawn from the damper cylinder 150.

During a compression (upward) stroke such as described above, the piston rod 120 moves further into the damper cylinder 150, thus occupying more of the total available internal volume of the damper cylinder 150. The volume occupied by the additional length of the piston rod 120 that enters the damper cylinder 150 displaces an equal volume of the hydraulic fluid 170, which moves upward and is accommodated by an upward movement of the floating piston 160. This decreases the volume of the internally-pressurized chamber 180 above the floating piston 160, which correspondingly increases the pressure somewhat. The net effect is that the added volume of the entering piston rod 120 is accommodated by an equally decreased volume of the internally-pressurized chamber 180.

During a rebound (outward) stroke the effects described above are reversed. In this case, since the piston rod 120 is being withdrawn, it occupies less of the total available internal volume of the damper cylinder 150. The space vacated by the withdrawn piston rod 120 is filled by the hydraulic fluid 170 which is urged downward by the pressure above the floating piston 160 to fill the vacated space. In so doing, the floating piston 160 moves downward, increasing the volume of the internally-pressurized chamber 180 above it, which correspondingly reduces the pressure somewhat.

The above-described principles of operation for a conventional DeCarbon-type single-tube, pressurized damper such as shown in FIG. 1 are well-known to those skilled in the art.

Referring now to FIGS. 2 and 3, additional structure in accordance with a first exemplary embodiment of the present invention is shown added to the prior-art damper 100 of FIG. 1. Since the structure and function of several of the parts in FIGS. 2 and 3 are substantially identical to those in FIG. 1, the corresponding parts are designated by the same reference numbers as in FIG. 1. (This also generally applies to all other FIGS. which follow.) A partition 210 is secured within the bore of the damper by a partition retaining ring 211. This partition 210 physically divides the hydraulic fluid into one portion above the partition 210, and another portion below it. The partition 210 has a plurality of rebound flow ports 220 covered by a check valve 230 which is lightly biased in contact with the partition 210 by a relatively soft check valve spring 231. Additionally, the partition 210 has a central compression flow port 240 which, in the position illustrated in FIG. 3, is blocked at its upper end by the small end of an intensifier piston 250.

The intensifier piston 250 is located within an intensifier housing 260, which can be integral with the damper cylinder 150 (as shown), or can be a separate structure sealed and retained within the bore of the damper cylinder 150. During upward movement of the intensifier piston 250 as occurs during operation (to be described in detail further on), the intensifier piston 250 is prevented from exiting the intensifier housing 260 by the intensifier retaining ring 251. The intensifier piston is sealingly engaged with the intensifier housing 260 at its upper (large diameter) end, as well as at its lower (smaller diameter) end. There is at least one vent port 270 which vents the space between the upper and lower seals of the intensifier piston 250 to outside atmospheric pressure. There is also at least one bi-directional flow port 280 which passes vertically through intensifier housing 260.

Still referring to FIGS. 2 and 3, the principles of operation of the present embodiment are described in the following paragraphs.

During a rebound stroke, the piston rod 120 is withdrawn from the damper cylinder 150, resulting in some amount of vacated volume toward the lower end of the damper cylinder 150. As described previously, this results in downward movement of the floating piston 160, as well as a downward flow of the hydraulic fluid 170 immediately below it. Since downward movement of the floating piston 160 reduces the space between the floating piston 160 and the partition 210, and since hydraulic fluid is incompressible, hydraulic fluid flows down through the bi-directional flow port(s) 280. It then flows down through the partition 210 via the rebound flow port(s) 220. It does this by opening the check valve 230 against the relatively light resistance of the check valve spring 231.

During a compression stroke, the piston rod 120 and the damping piston 140 move further into the damper cylinder 150, thus displacing a volume of the hydraulic fluid 170 equal to the volume of the additional length of the piston rod 120 which enters the damper cylinder 150. As described previously, this results in an upward flow of the displaced volume of hydraulic fluid, accommodated by an upward movement of the floating piston 160, which somewhat decreases the volume, and increases the pressure, in the internally-pressurized chamber 180. However, in order to do so, the displaced volume of hydraulic fluid must first pass through the partition 210. In accordance with the known principles of hydraulic intensifiers, to achieve this the fluid must create an upward force (pressure) at the lower (small) end of the intensifier piston 250 which is sufficient to overcome the downward force (pressure) at the upper (large) end of the intensifier piston 250. To do so requires a pressure at the lower end of the intensifier piston 250 that is greater than the pressure at the upper end of the intensifier piston 250 by a multiple approximately equal to the ratio of the cross-sectional area of the large end of the intensifier piston 250 to the cross-sectional area of the compression flow port 240.

For simplicity, it is assumed that the diameter of the small end of the intensifier piston 250 is only slightly greater than the diameter of the compression flow port 240. Thus, the annular contact area between these parts is relatively quite small, and it can be said that, for flow through the compression flow port 240, a pressure is required at the lower end of the intensifier piston 250 that is greater than the pressure at the upper end of the intensifier piston 250 by a multiple approximately equal to the ratio of the area of its large end divided by the area of its small end.

This pressure differential (multiple) between the small end and large end of the pressure intensifier 250 creates a compression damping effect in the damper.

Here is an example. Assume the diameter of the large end of the intensifier piston 250 is twice the diameter of the small end, and thus that the ratio of their cross-sectional areas is 4:1. Assume the diameter of the piston rod 120 is O½", and thus it has a cross-sectional area of about 0.2 square inches. Assume the damping piston 140 has traveled inward into the damper cylinder 150 some distance (i.e., it is not fully-extended or "topped-out" against the seal head 130), as shown in FIG. 2. Assume that the pressure of the internally-pressurized chamber 180 above the floating piston is 100 psi. Assume static conditions, with the damping piston 140 not moving. Given these assumptions, and based on elementary principles, there is a uniform pressure of 100 psi throughout the interior of the damper. Furthermore, it can be readily calculated that, under these static conditions, the 100 psi internal pressure acting on the 0.2 square inch cross-sectional area of the piston rod 120 creates a 20-pound force tending to extend the piston rod 120. In racing circles, this 20-pound force is sometimes referred to as "static nose force".

The above described static conditions. Now the compression damping effect produced by the intensifier piston 250 during a compression stroke (inward movement of the piston rod 120) is described. Per basic principles, for an intensifier piston 250 with a cross-sectional area ratio of 4:1, a pressure of approximately 400 psi at the small end is required to overcome the 100 psi pressure at the large end (which originates from the internally-pressurized chamber 180 above the floating piston 160), in order to cause the intensifier piston 250 to move upward, thus unblocking the compression flow port 240 and allowing upward flow of the hydraulic fluid 170 displaced by the inward movement of the piston rod 120.

For simplicity, it is assumed in the following discussion that the damping piston 140 has several large thru-holes and no restrictive valving (note that, actually, the exemplary embodiments of the present invention generally do incorporate restrictive valving on the damping piston 140 which does create compression damping forces). In other words, for purposes of clarity in describing the basic principles of the present embodiment, it is assumed here that the damping piston 140 itself creates no compression damping forces. Now, the 400 psi pressure created at the small end of the intensifier piston 250 acts uniformly throughout all portions of damper cylinder 150 below the intensifier piston 250. Acting on the 0.2 square inch cross-sectional area of the piston rod 120, it creates an 80-pound "dynamic nose force". The difference between the previous 20-pound "static nose force" and this 80-pound "dynamic nose force" is 60 pounds; this 60 pounds represents the compression damping force produced by the present embodiment. Increasing the diameter and cross-sectional area of the piston rod 120, of course, would create an even greater damping force.

To further describe the principles of the present embodiment, in the following it will be assumed that the above compression stroke continues inward for a distance sufficient to move the floating piston 160 upward some amount and increase the pressure in the internally-pressurized chamber 180 from 100 psi to 150 psi. This 150 psi pressure, of course, acts on the large end of the intensifier piston 250 and now approximately 600 psi pressure (basic 4:1 ratio) is required at the small end of the intensifier piston 250 in order for it to remain open, allowing continuation of the compression stroke. With 600 psi now acting on the 0.2 square inch cross-sectional area of the piston rod 120 a 120-pound "dynamic nose force" is now produced. In other words, as the compression stroke continues and the damping piston 140 and piston rod 120 travel further into the damper cylinder 150, the volume of hydraulic fluid displaced by the piston rod 120 causes the floating piston 160 to move upward, which increases the pressure in the internally-pressurized chamber 180, which increases the compression damping effect produced by the present embodiment.

Put another way, the present embodiment produces a "position-sensitive" compression damping effect, with the compression damping force increasing as the piston rod 120 and the damping piston 140 move further into the damper cylinder 150. The extent and degree of this position-sensitive effect is influenced by the pre-set volume of the internally-pressurized chamber 180 above the floating piston 160, relative to the diameter and maximum available travel of the piston rod 120. If the pre-set volume of the internally-pressurized chamber 180 is relatively large, the position-sensitive effect is reduced. If the pre-set volume is relatively small, the position-sensitive effect is increased.

Figure 4:
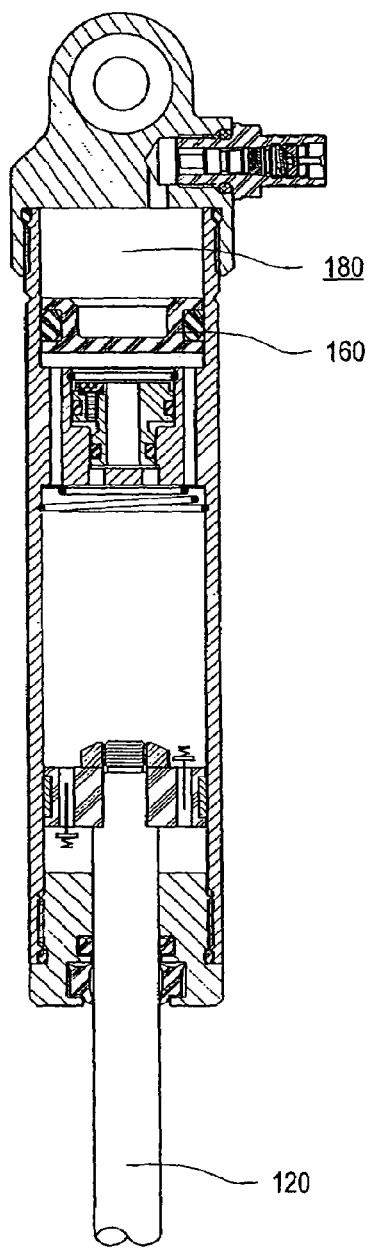
FIG. 4 is a sectional front view of the prior-art damper of FIG. 1 modified in accordance with a second exemplary embodiment of the present invention.
Figure 5:
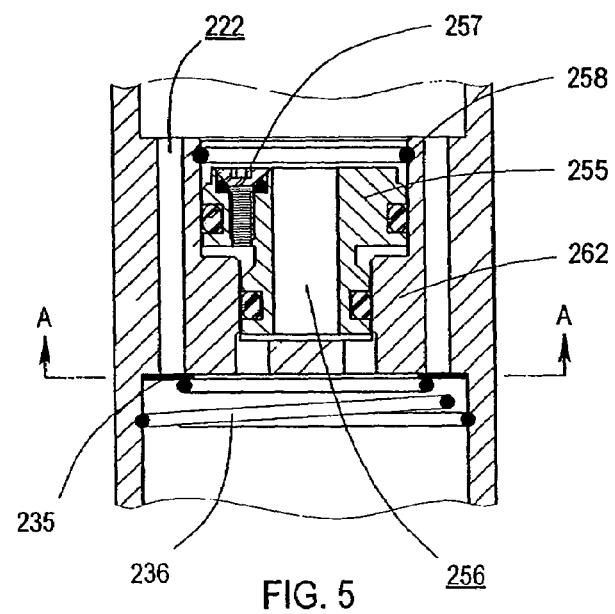
FIG. 5 is an enlarged partial sectional front view of the damper of FIG. 4, showing the added structure of this embodiment of the present invention.
Figure 6:
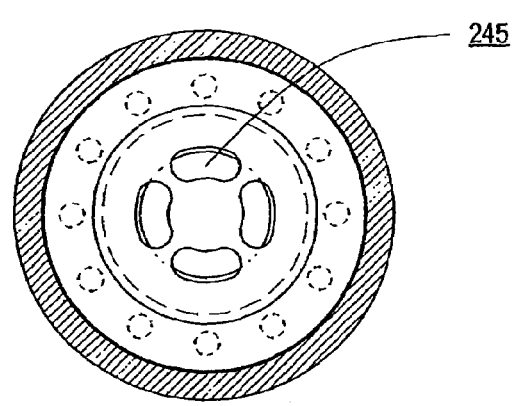
FIG. 6 is a sectional view of the damper of FIG. 5, taken through section A-A of FIG. 5.

FIGS. 4, 5, and 6, show another exemplary embodiment of the present invention. This embodiment differs from the previous embodiment of FIGS. 2 and 3 primarily due to an alternate configuration of the intensifier piston 255, as best seen in FIG. 5. As compared with the previous "solid" intensifier piston 250 of FIG. 3, the intensifier piston 255 of FIG. 5 has an intensifier piston compression flow port 256 which passes through its center. Another difference is the addition of an intensifier bleed screw 257 instead of the vent port 270 in FIG. 3. During assembly of the intensifier piston 255 into the partition 262, this feature enables any trapped air pressure in the space between the upper and lower seals of the intensifier piston 255 to be vented by removing the intensifier bleed screw 257. It further enables said space to be sealed off again, to provide proper operation, by re-installing said screw. This is done as part of the final assembly of these components.

Still referring to FIG. 5, the intensifier retaining ring 258 utilized here differs in form, but not function, from the previous intensifier retaining ring 251 of FIG. 3, Similarly, the check valve 235, the check valve spring 236, and the rebound flow port 222 as shown in FIG. 5 all differ in form, but not function, from the equivalent features illustrated in FIG. 3.

One practical advantage of the embodiment of FIG. 5 as compared with the embodiment of FIG. 3 is that it combines the functions of both the partition 210 and the intensifier housing 260 of FIG. 3 into one component, the partition 262 of FIG. 5. This reduces total part count and cost of the damper unit.

In operation during a compression stroke, fluid displaced by inward movement of the piston rod 120 applies pressure to the small end of the intensifier piston 255 via the arc flow port(s) 245. Similar to the principles of operation of the previous embodiment, the intensifier piston 255 moves upward to permit upward flow of hydraulic fluid when the pressure ratio between the small end and the large end equals the area ratio of the large and small ends. For the intensifier piston 255 of FIG. 5, this statement refers specifically to the annular areas of the large and small ends.

Here is an example. Assume the ratio of the annular area at the large end of the intensifier piston 255 to the annular area at the small end is 2:1. Also assume that the nitrogen in the internally-pressurized chamber 180 above the floating piston 160 exerts a downward pressure of 100 psi on the annular area at the large end of the intensifier piston 255. Given these parameters, and in accordance with basic principles, a pressure of 200 psi must be applied to the annular area at the small end of the intensifier piston 255 in order to cause the intensifier piston 255 to move upward and permit upward flow of the displaced hydraulic fluid through the intensifier housing arc port(s) 245, and then up through the intensifier piston compression flow port 256.

Figure 7:
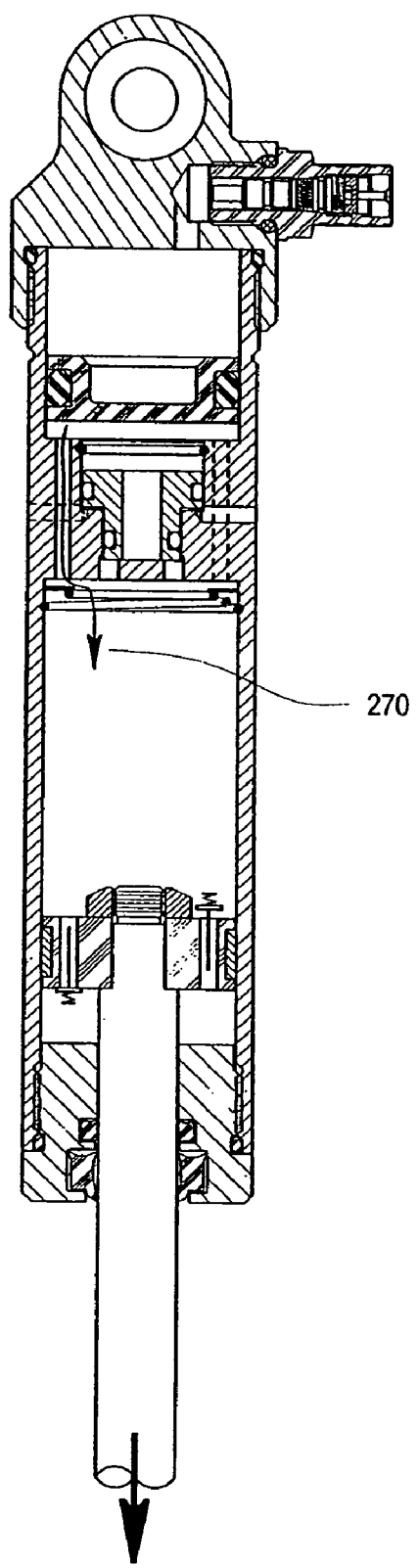
FIG. 7 is a sectional front view of the damper of FIG. 4, showing shaft displacement fluid flow through the fixed partition member during an extension stroke of the damper.
Figure 8:
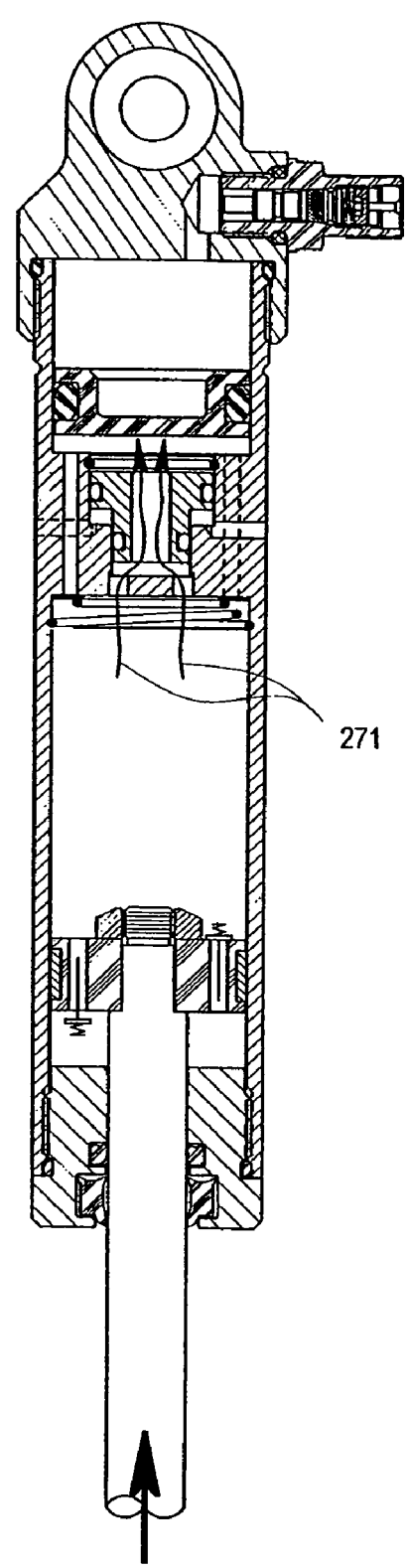
FIG. 8 is a sectional front view of the damper of FIG. 4, showing shaft displacement fluid flow through the intensifier valve during a compression stroke of the damper.

FIG. 7 illustrates the shaft displacement rebound fluid flow 270 that occurs through the structure of FIG. 5 during a rebound stroke of the damper. Similarly, FIG. 8 illustrates the shaft displacement compression fluid flow 271 that occurs during a compression stroke of the damper.

Figure 9:
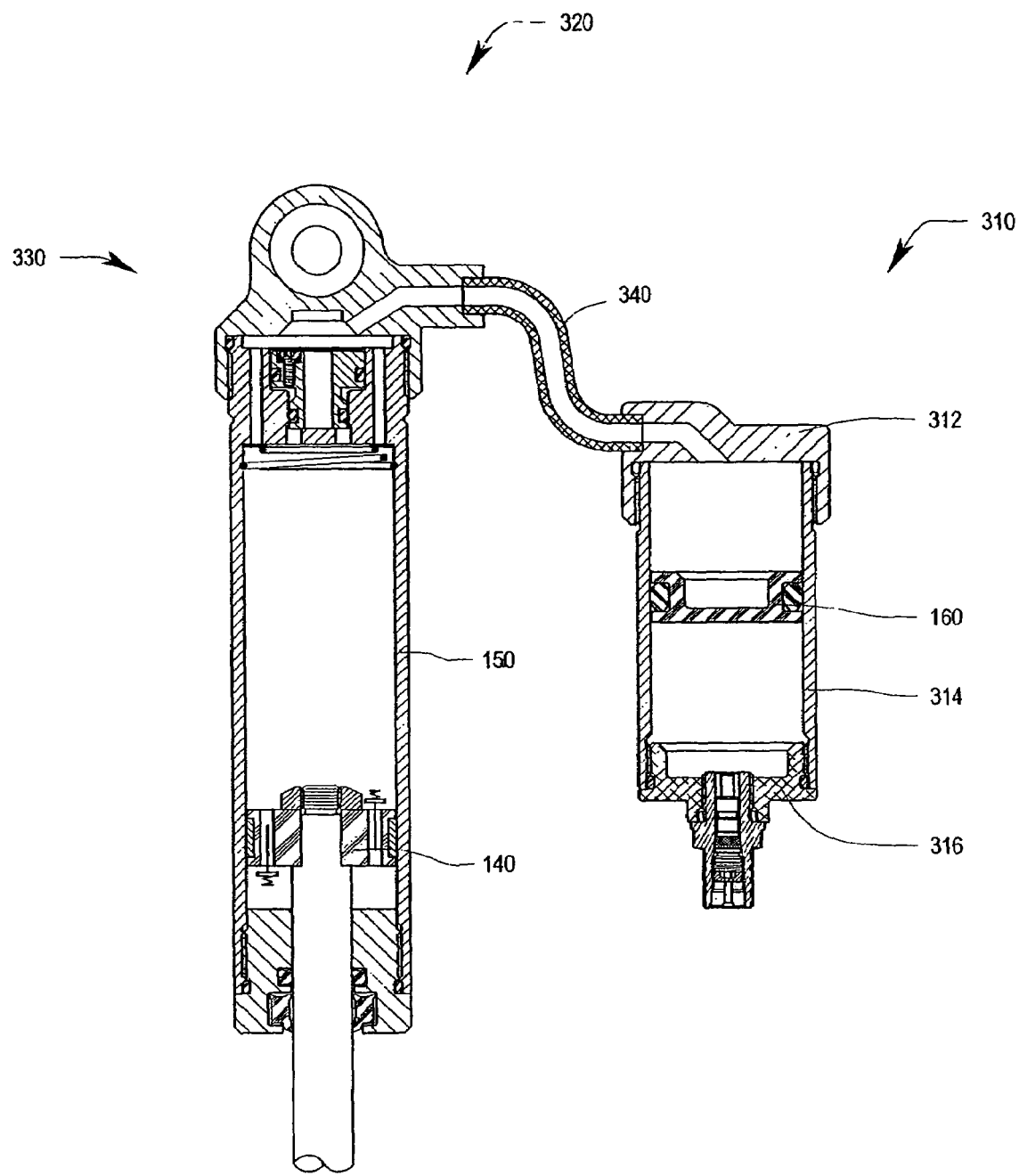
FIG. 9 is a sectional front view of the damper of FIG. 4 modified in accordance with a third exemplary embodiment of the present invention, with the intensifier valve structure moved to the upper end of the damper cylinder, with a remote reservoir assembly added, and with the floating piston re-located from the damper cylinder to the reservoir cylinder.

FIG. 9 shows another exemplary embodiment of the present invention. This embodiment is similar to the previous embodiment shown in FIGS. 4, 5, 6, 7, and 8, except that a remote reservoir assembly 310 has been added. Also, the intensifier assembly 330 has been moved upward to the upper end of the damper cylinder 150. The remote reservoir assembly 310 is connected to the main damper cylinder assembly 320 by an hydraulic hose 340. The remote reservoir assembly 310 includes a reservoir end fitting 312, a reservoir cylinder 314, a floating piston 160, and a reservoir cap 316.

One advantage of the embodiment of FIG. 9 as compared with previous embodiments is that, for a given length of damper cylinder 150 it increases the available travel distance of the damping piston 140 (available "damper stroke").

Figures 10, 11:
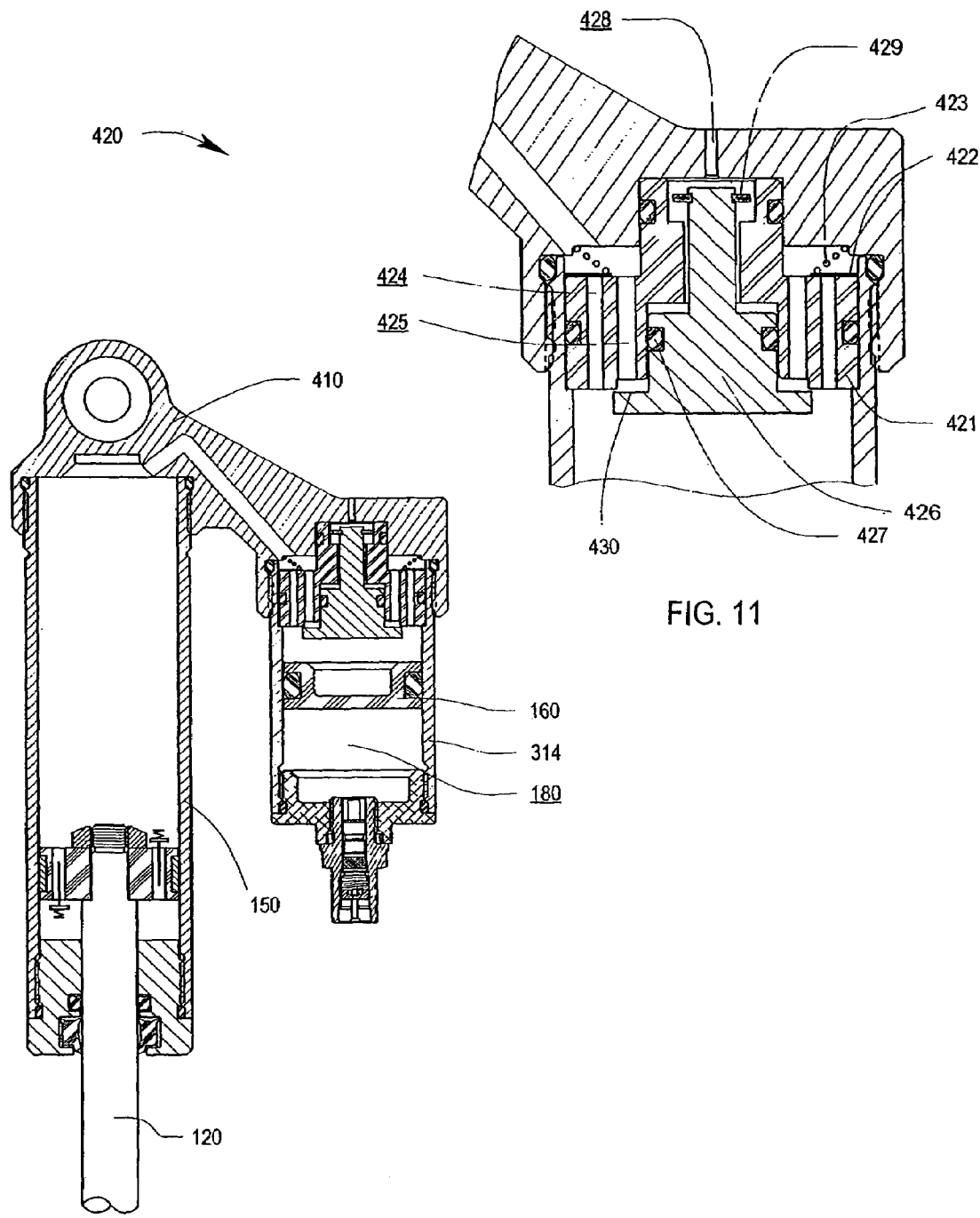
FIG. 10 is a sectional front view of the prior-art damper of FIG. 1, modified in accordance with a fourth exemplary embodiment of the present invention, with the upper eyelet replaced by a piggyback eyelet with an attached reservoir cylinder, with the floating piston re-located from the damper cylinder to the reservoir cylinder, and with the intensifier assembly located in the upper end of the reservoir cylinder.
FIG. 11 is an enlarged partial sectional front view of the damper of FIG. 10, showing the added structure of this embodiment of the present invention.

FIGS. 10 and 11 show an exemplary embodiment of the present invention comprising a piggyback eyelet 410 with an attached reservoir cylinder 314 containing a floating piston 160 and an intensifier assembly 420. The function of the partition 421, the check valve 422, the check valve spring 423, and the rebound flow port 424 of this embodiment are similar to the corresponding structures of the previous embodiment shown in FIG. 3. The compression flow port 425 in the partition 421 provides a compression flow path for fluid from the damper cylinder 150 to an upward-facing annular area of the intensifier piston 426. Due to the piston seal 427 and the vent 428 provided, the two other upward-facing areas of the intensifier piston 426 are at atmospheric pressure (considered zero pressure for purposes of this description). The large area of the bottom face of the intensifier piston 426 is subjected to the pressure within the internally-pressurized chamber 180 below the floating piston 160. The intensifier piston 426 is fitted with an intensifier retaining ring 429 to ensure that it remains within the partition 421 during assembly and other possible conditions.

Similar to the principles of operation described for previous embodiments of the present invention, under static conditions the intensifier piston 426 is urged upward by the pressure on its bottom face into firm, sealing contact with the partition 421. The intensifier piston 426 remains in firm sealing contact with the partition 421 unless the fluid pressure from the compression flow port 425 exerted downward against the upward-facing annular area 430 of the intensifier piston 426 creates sufficient force to overcome the upward force exerted by pressure on the bottom face of the intensifier piston 426. This requires that pressure in the compression flow port 425 equals a multiple of the pressure in the internally-pressurized chamber 180; said multiple being approximately equal to the ratio of the area of the bottom face of the intensifier piston 426 to the area of the upward-facing annular area 430 of the intensifier piston 426.

The relationship noted above is approximate only, due to the relatively narrow annular overlap area where the intensifier piston 426 contacts the partition 421. During operation, when the intensifier piston 426 moves downward, and downward compression fluid flow occurs, the compression fluid pressure acting downwardly on this generally narrow annular edge portion of the overall upward-facing annular area 430 of the intensifier piston 426 is somewhat reduced in accordance with Bernoulli principles.

Similar also to previous embodiments: the increased pressure that is required to urge the intensifier piston 426 downward, to permit flow of the displaced fluid, acts on the cross-sectional area of the piston rod 120, thus creating a compression damping force.

Figures 12, 13:
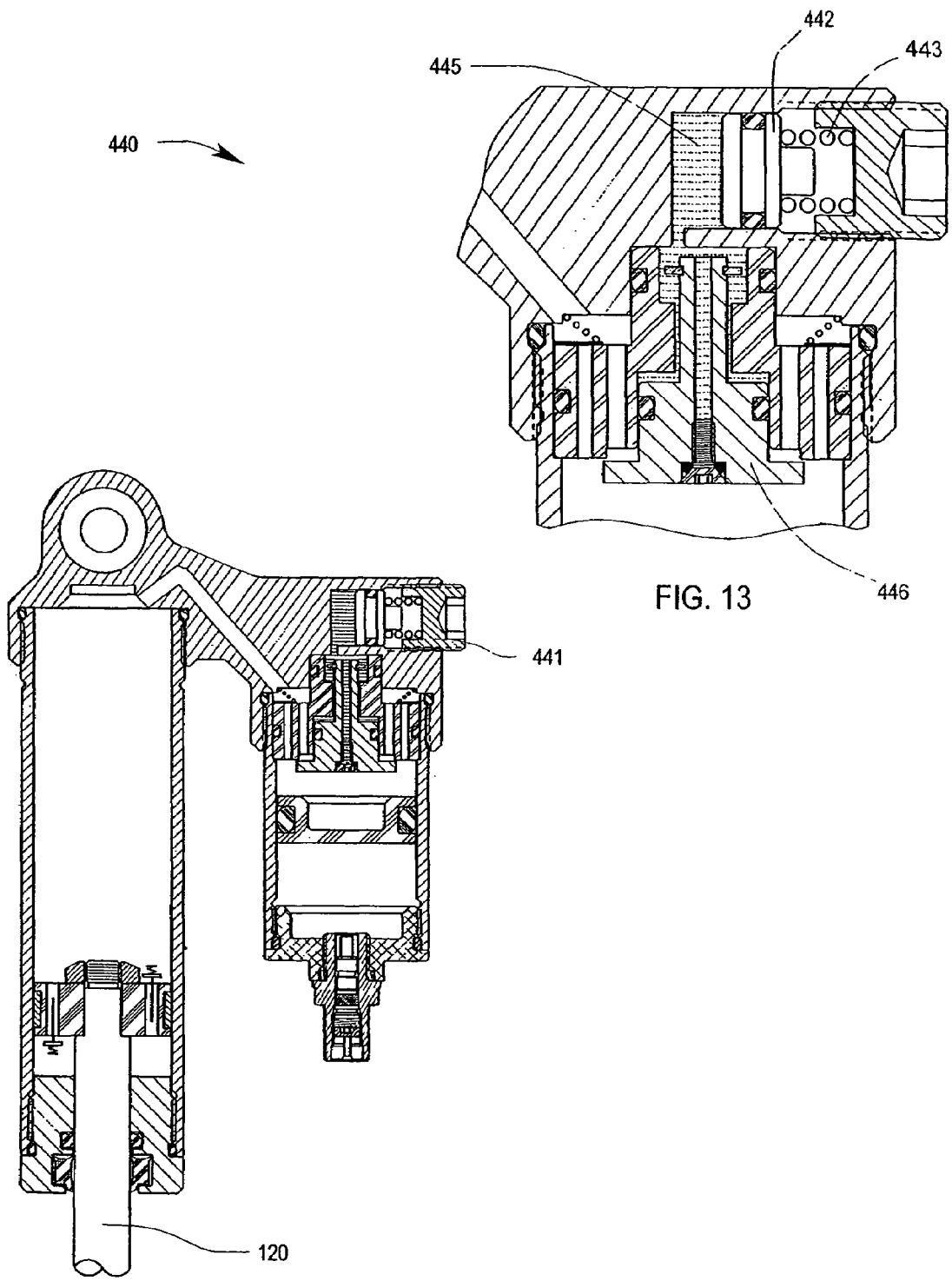
FIG. 12 is a sectional front view of the damper of FIG. 10, showing this embodiment with the addition of an external intensifier adjusting screw.
FIG. 13 is an enlarged partial sectional front view of the damper of FIG. 12.

FIGS. 12 and 13 show a modified version of the embodiment of FIGS. 10 and 11 which provides external adjustability of the compression damping force produced by the intensifier assembly 440. This modified embodiment includes an intensifier adjusting screw 441, an adjuster piston 442, and an adjuster coil spring 443. In operation, rotation of the intensifier adjusting screw 441 increases or decreases the preload force on the adjuster coil spring 443. This force is transmitted through the adjuster piston 442 as an increased or decreased pressure in the adjacent hydraulic fluid 445. This increased or decreased pressure is communicated to the upward-facing areas of the intensifier piston 446 with which the hydraulic fluid 445 is in contact. The downward force thus created on the intensifier piston 446 reduces, to a greater or lesser degree depending on the specific adjustment of the preload force on the adjuster coil spring 443, the compression fluid pressure required to cause the intensifier piston 446 to move downward to permit compression fluid flow. Thus, this adjustment mechanism alters the compression damping force which is experienced at the piston rod 120.

Figures 14, 15:
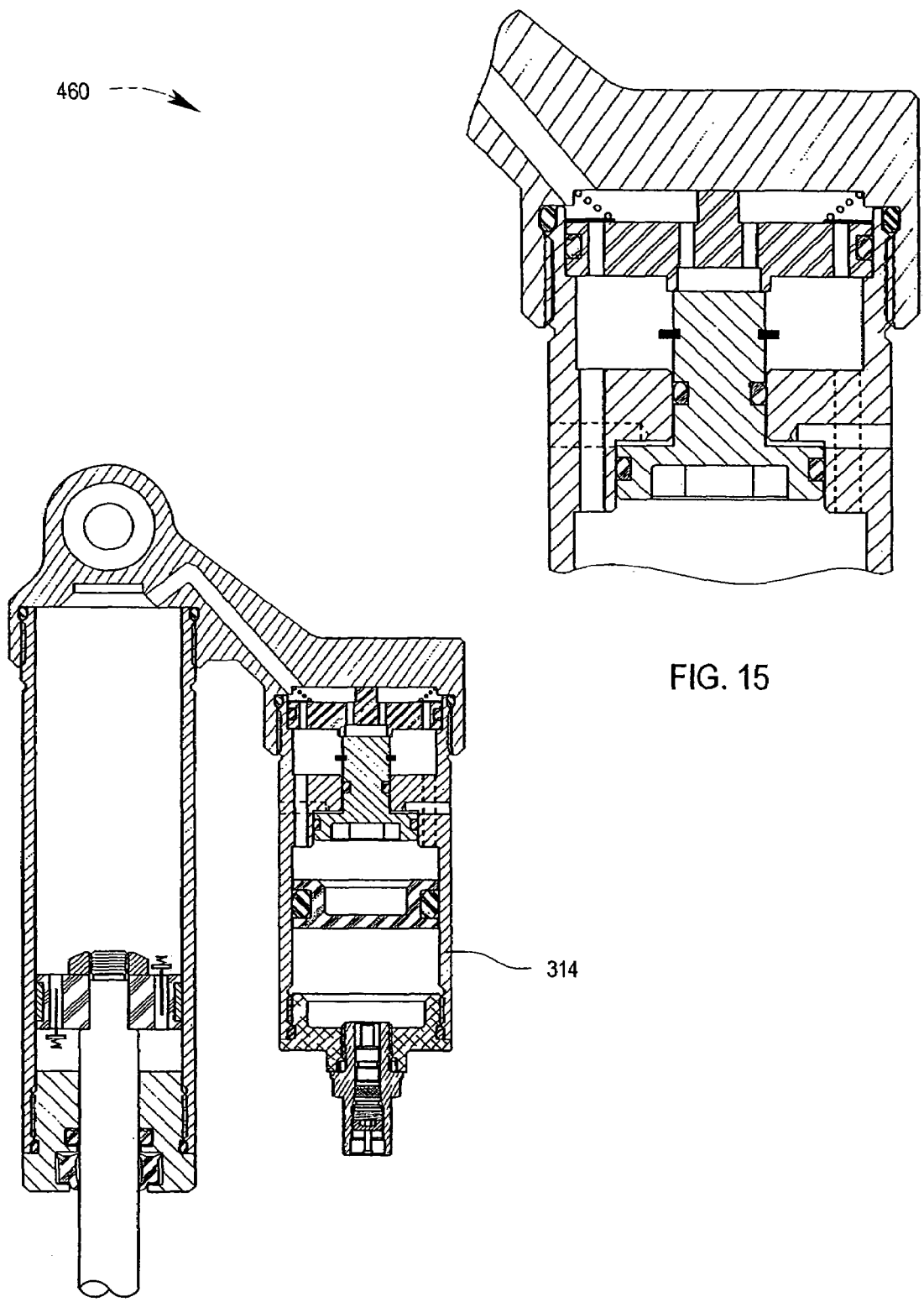
FIG. 14 is a sectional front view of the damper of FIG. 10, with a fifth exemplary embodiment of the present invention located in the upper end of the reservoir cylinder.
FIG. 15 is an enlarged partial sectional front view of the damper of FIG. 14.

FIGS. 14 and 15 show another exemplary embodiment of the present invention. This embodiment utilizes an intensifier assembly 460 structure similar to that of FIGS. 2 and 3, but incorporated into the upper end of a reservoir cylinder 314 similar to that of FIGS. 10 and 11. The principles of operation for this embodiment are identical to those previously described for FIGS. 2 and 3.

Figure 16:
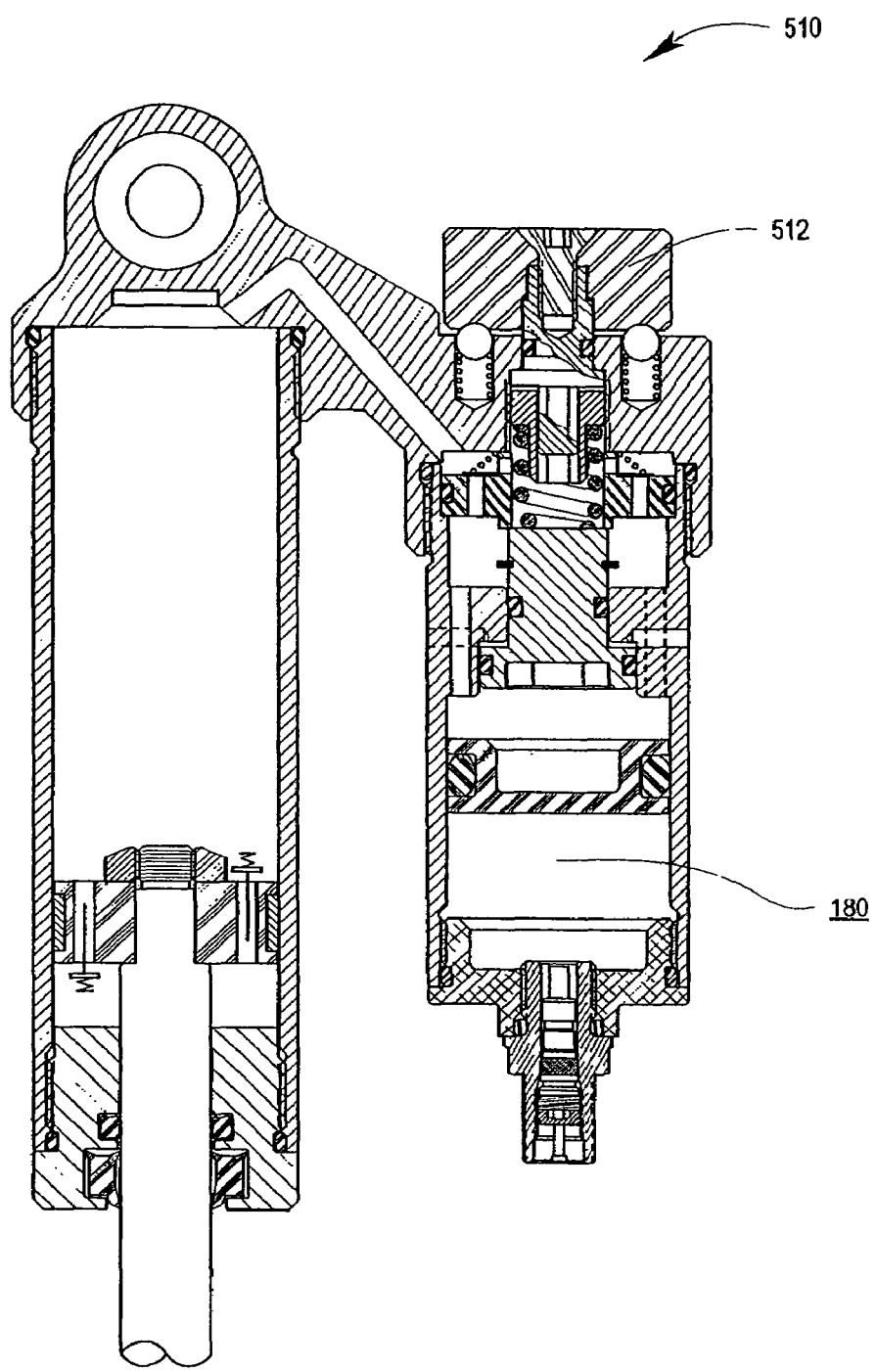
FIG. 16 is a sectional front view of the damper of FIG. 10, with a sixth exemplary embodiment of the present invention located in the upper end of the reservoir cylinder.
Figure 17:
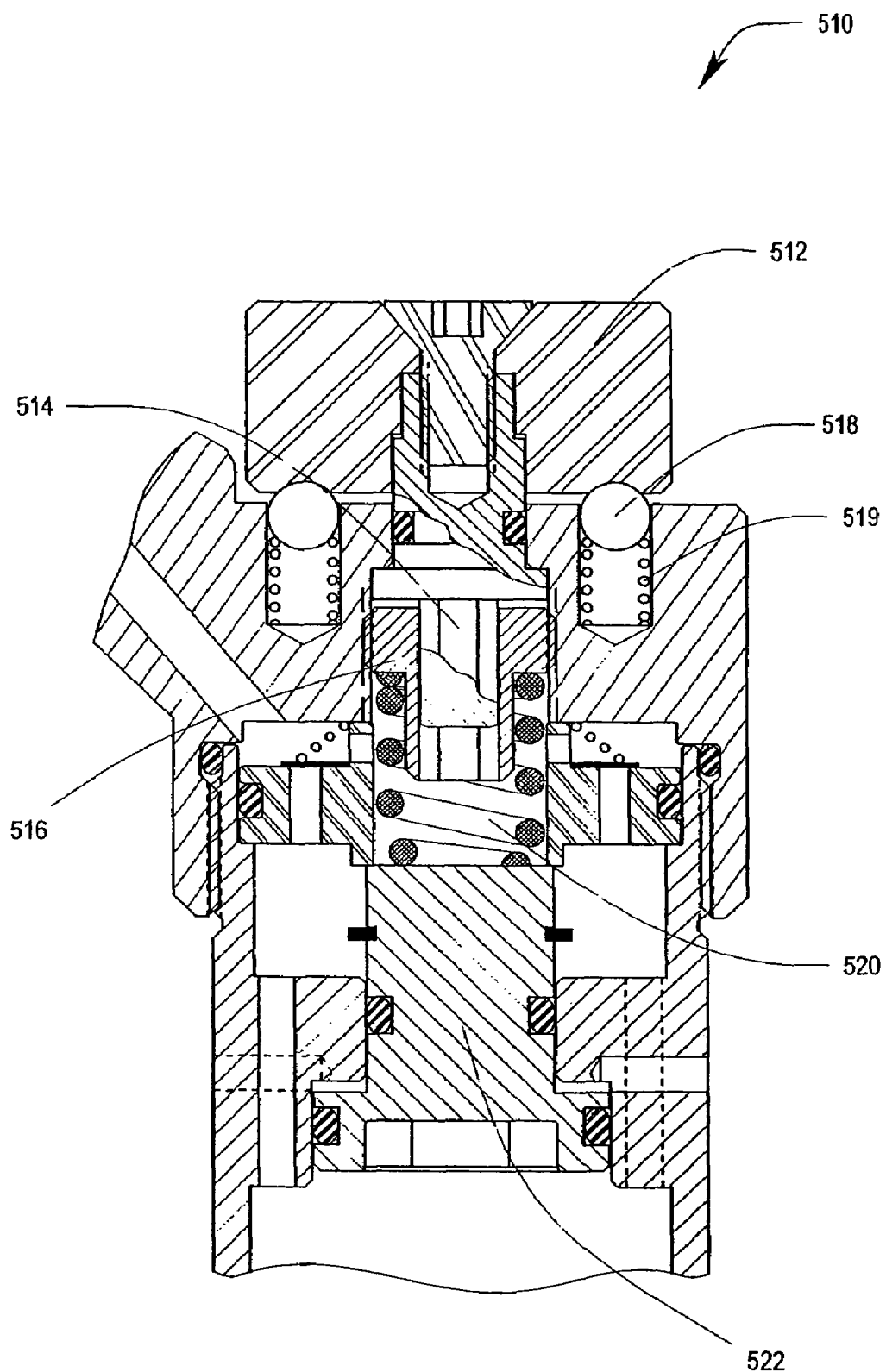
FIG. 17 is an enlarged partial sectional front view of the damper of FIG. 16.

FIGS. 16 and 17 show yet another exemplary embodiment of the present invention. This embodiment utilizes an intensifier assembly 510 similar to that of FIGS. 14 and 15, but, in addition, provides external adjustability via an intensifier adjuster knob 512. The principles of operation for this embodiment are similar to those previously described for FIGS. 14 and 15, except for operation of the adjuster structure which is described in the following.

As best seen in FIG. 17, an external rotatable intensifier adjuster knob 512 is secured to a freely-rotating hex driver shaft 514 which includes a downwardly-projecting male hex portion which is keyed into a female hex portion of a threaded spring base 516 which rotates with it. The intensifier adjuster knob 512 is fitted with at least one detent ball 518 and one detent spring 519 which provide a detent function by providing audible and tactile feedback for each quarter turn (for example) adjustment of the intensifier adjuster knob 512, as well as by helping to secure it at any pre-set position. The threaded spring base 516 is threaded on its outside diameter to produce axial movement upon rotation. Depending on the direction of rotation of the intensifier adjuster knob 512, axial movement of the threaded spring base 516 increases or decreases the spring preload force of the intensifier adjuster spring 520.

The principles of operation of this adjustment are described in the following.

First, as previously described, the basic principle of operation of the intensifier piston 522 itself can be best characterized as: in order for the intensifier piston 522 to move downward ("open"), the force(s) acting downward on the small end of the intensifier piston 522 must equal (or, actually, slightly exceed) the force(s) acting upward on the big end. For the embodiment as shown in FIGS. 16 and 17, the force acting upward on the big end of the intensifier piston 522 equals the cross-sectional area of the big end times the pressure in the internally-pressurized chamber 180. Next, as to the small end of the intensifier piston 522, there are two forces acting downward on it. One force is the compression fluid flow pressure acting on the small end of the intensifier piston 522 times the cross-sectional area of the small end. The other force is the force exerted by the intensifier adjuster spring 520. These two forces together must slightly exceed the upward force on the big end of the intensifier piston 522 for the intensifier piston 522 to move downward ("open"), permitting compression fluid flow.

In accordance with the above principles, turning the intensifier adjuster knob 512 to increase the preload force of the intensifier adjuster spring 520 reduces the compression damping force effect produced by the adjustable intensifier assembly 510. In fact, depending on specific parameters including the spring constant ("stiffness") of the intensifier adjuster spring 520, it would be possible to adjust for enough spring preload force to pre-set the intensifier piston 522 in an initially "open" condition such that the adjustable intensifier assembly 510 produced no flow restriction, and thus no compression damping force. Extending this example, a combination of parameters could be determined according to this embodiment of the present invention such that the pressure build-up in the internally-pressurized chamber 180 at some pre-determined point in the compression travel ("stroke") of the piston rod 120 exceeded the spring preload force, thus closing the intensifier piston 522 and thus creating a compression fluid flow restriction and a compression damping effect. In other words, a combination of parameters could be chosen whereby the compression damping force produced varied from zero for the first portion of a compression stroke, to a finite and increasing value beyond that first portion.

Conversely, turning the intensifier adjuster knob 512 to decrease the preload force of the intensifier adjuster spring 520 increases the compression damping force effect produced by the adjustable intensifier assembly 510.

FIGS. 18 and 19 show another exemplary embodiment of the present invention. This embodiment incorporates an intensifier piston 540 and partition assembly 550 similar in structure and function to that previously described in FIGS. 2 and 3. However, the key difference here is that, in FIGS. 18 and 19 the pressure acting on the large end of the intensifier piston 540 is supplied by an external pressure source (not shown), not by an internal pressure source, such as the internally-pressurized chamber 180 as it was in previous embodiments. Thus, the pressure required at the small end of the intensifier piston 540 to permit compression fluid flow, and therefore the compression damping force produced, depends on the external pressure supplied. The pressure in FIGS. 18 and 19 is supplied to the externally pressurized chamber 560 through a pressure port 562 fed by an external source (not shown) via a pressure fitting 564. The pressure source, and the medium contained in the externally pressurized chamber 560 can be either pneumatic or hydraulic. A pneumatic medium and system is preferred where simplicity and low cost are dominant factors. An hydraulic medium is preferred where rapid responsiveness (quick response times) is important.

As shown in FIG. 19, a pressure chamber sealing head 566 is held in place by seal head retaining rings 568, and seals the upper end of the externally pressurized chamber 560.

One advantage of the embodiment of FIGS. 18 and 19 is the remote, external controllability provided. A system could be designed, for example, utilizing various sensors, as are known in the art, on a vehicle. The information from these sensors, as is known in the art, could be input to an on-board computer module having a pre-established algorithm for determining, for any given combination of inputs, the amount of pressure to be applied to the externally-pressurized chamber 560, and, thus, the desired level of compression damping produced by the damper. A system of this type, utilizing an hydraulic medium, could sense actual vehicle conditions and respond within milliseconds of real-time, providing enhanced dynamic performance.

Figures 20A, 21:
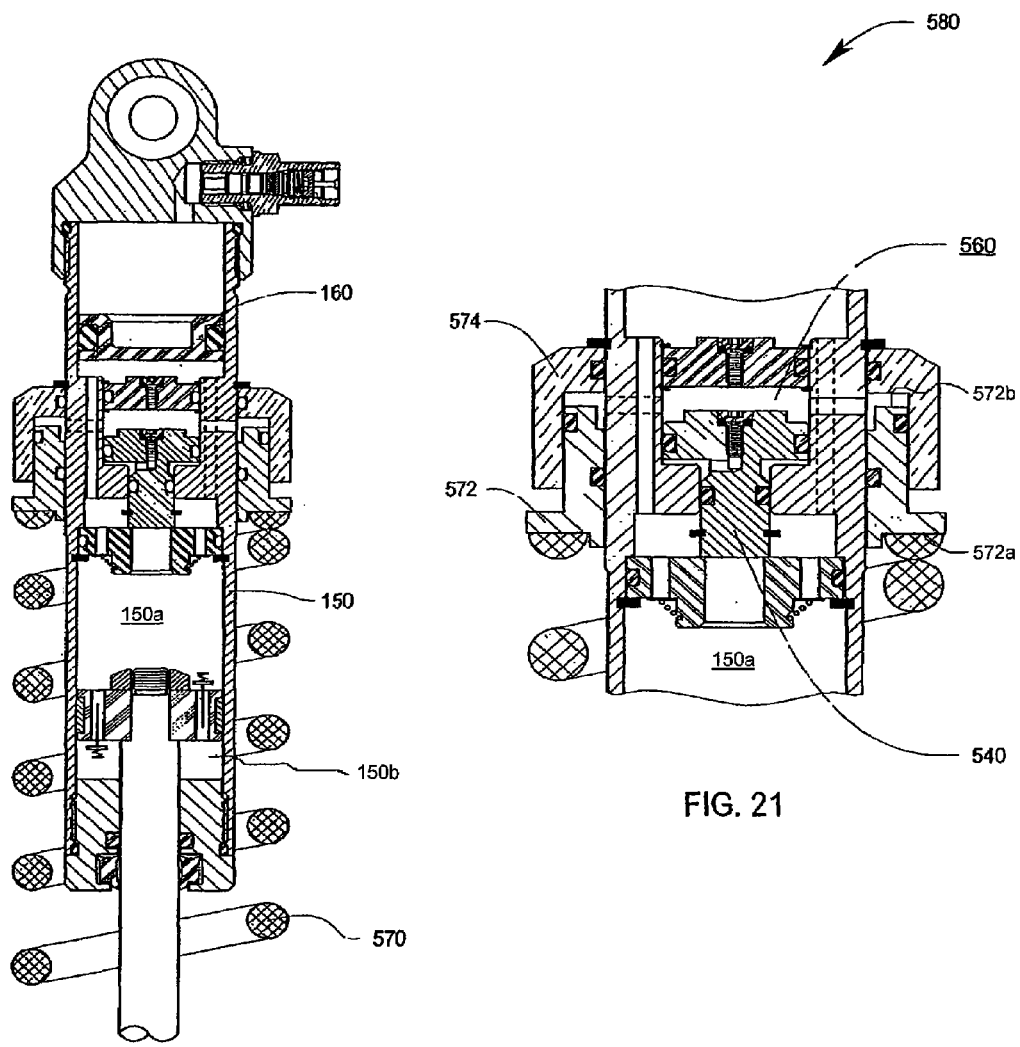
FIG. 20A is a sectional front view of the prior-art damper of FIG. 1 modified in accordance with an eighth exemplary embodiment of the present invention.
FIG. 21 is an enlarged partial sectional front view of the damper of FIG. 20A, showing the added structure of this embodiment of the present invention.

FIGS. 20A and 21 show another exemplary embodiment of the present invention. This embodiment is similar to the embodiment of FIGS. 18 and 19 except that the externally pressurized chamber 560 is directly pressurized by the spring force of a suspension spring, such as a coil-over spring 570. The upper end of the coil-over spring 570 is supported by a first portion 572a of a moveable element, such as a spring support ring 572. The lower end of the coil-over spring 570 (not shown) is supported by a ring (not shown) attached to the lower eyelet (not shown, but equivalent to lower eyelet 112 in FIG. 1), in a conventional arrangement as is well-known in the art. The spring support ring 572 has a second portion 572b in sealed, slidable contact with the damper cylinder 150 and the support ring housing 574. The space between the spring support ring 572 and the support ring housing 574, as well as the space in the externally pressurized chamber 560, is filled with hydraulic fluid. Note that this hydraulic fluid is entirely distinct and separated from the hydraulic fluid contained within the rest of the damper unit.

The principles of operation of the embodiment of FIGS. 20A and 21 are similar to those described for the embodiment of FIGS. 18 and 19. The only difference is that in FIGS. 20A and 21 the pressure source is the external coil-over spring 570, rather than a generalized pressure source. In a typical implementation, the compression damping force produced by the intensifier assembly 580, from the beginning to the end of a full-travel compression stroke, would begin at a level determined by the initial preload of the coil-over spring 570, then increase linearly with the depth of the compression stroke, according to the spring rate ("stiffness") of the coil-over spring 570. This characteristic could be described, as is known in the art, as a linearly-increasing position-sensitive compression damping curve.

In other words, assuming a typical "linear" coil-over spring 570 as is known in the art, the compressed force of the coil-over spring 570 would increase linearly as it was compressed (i.e., decreased in length). This force, directly supported by the spring support ring 572, would produce a pressure in the externally pressurized chamber 560 that varied in direct proportion. This pressure, multiplied by the intensifier piston 540, would proportionally increase the required pressure to unseat the small end of the intensifier piston 540 to permit compression fluid flow, and thus would proportionally increase the compression damping force produced as a function of the depth of the compression stroke.

Figure 20B:
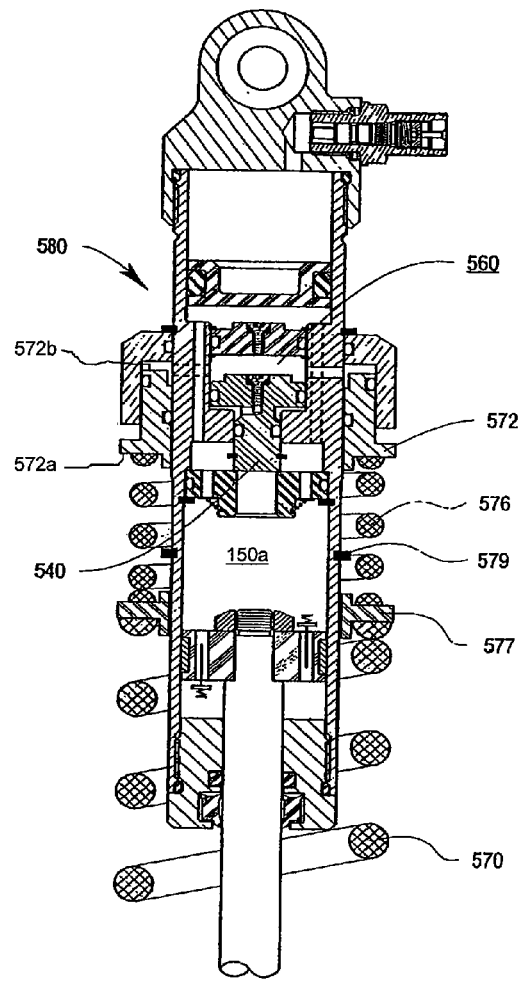
FIG. 20B is an alternate version of the damper of FIG. 20A with modified structure to provide a first alternate shape to the compression damping characteristic produced by the exemplary embodiment of FIG. 20A.

FIG. 20B shows an alternate version of the embodiment of FIG. 20A, including addition of a secondary spring 576 in series with the main coil-over spring 570, a dual-spring adaptor ring 577, and a travel limit retainer ring 579. The location of the travel limit retainer ring 579, and the spring rate of the secondary spring 576 relative to the main coil-over spring 570, is determined such that, during a compression stroke of the damper, the spring adaptor ring 577 engages the travel limit retainer ring 579 at some selected point in the travel. For example, on a damper with a maximum available stroke of 4-inches, the spring adaptor ring 577 might engage the travel limit retainer ring 579 at mid-stroke (i.e., at 2-inches of travel). In this example, the spring force supported by the spring support ring 572, would increase linearly for the first 2-inches of travel, as the secondary spring 576 continued to compress. However, due to the function of the travel limit retainer ring 579, for travel beyond this point the secondary spring 576 does not compress any further (only the main coil-over spring 570 continues to compress), and thus the spring force supported by the spring support ring 572 does not increase beyond the first 2-inches of travel.

Still referring to FIG. 20B, in accordance with principles previously described, the compression force transmitted from the first portion 572a of the spring support ring 572 to the second portion 572b of spring support ring 572 produces a pressure in the externally pressurized chamber 560 that varies in direct proportion with the compression force. In turn, this pressure, multiplied by the intensifier assembly 580, proportionately increases the required pressure to unseat the small end of the intensifier piston 540 to permit compression fluid flow. Thus, the compression damping force produced by the intensifier assembly 580 as a function of the depth of the compression stroke has the following characteristic shape: it begins at a level determined by the initial spring preload (the force of both springs is equal until the travel limit retainer ring 579 is engaged), it then increases linearly with travel until the spring adaptor ring 577 engages the travel limit retainer ring 579, at which point it remains constant ("flattens out") regardless of increasing travel. This type of compression damping characteristic is desirable for certain applications.

Figure 20C:
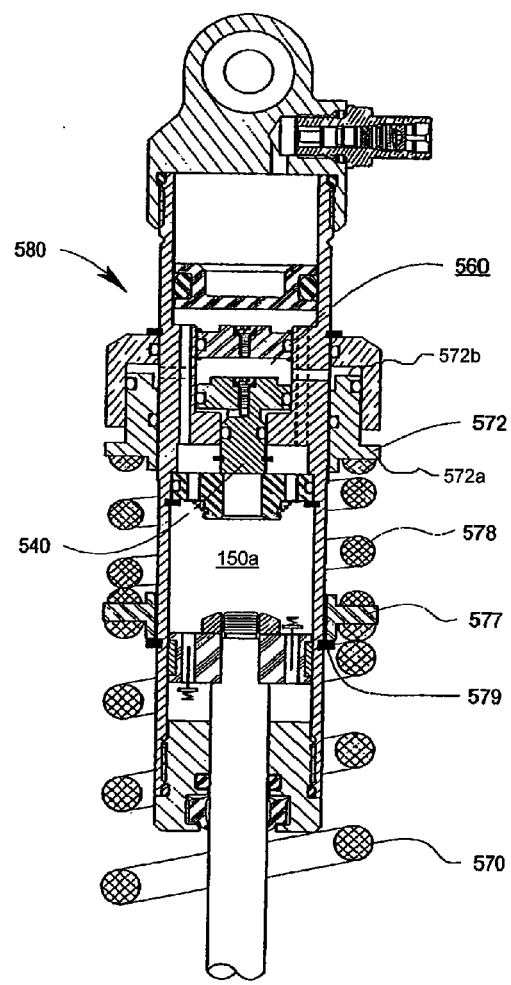
FIG. 20C is an alternate version of the damper of FIG. 20A with modified structure to provide a second alternate shape to the compression damping characteristic produced by the exemplary embodiment of FIG. 20A.

FIG. 20C shows another alternate version of the embodiment of FIG. 20A, including addition of a secondary spring 578 in series with the main coil-over spring 570, a dual-spring adaptor ring 577, and a spring travel limit retainer ring 579. In FIG. 20C the location of the travel limit retainer ring 579, and the spring rate of the secondary spring 578 relative to the main coil-over spring 570, is determined such that the adaptor ring 577 is initially in engagement with the travel limit retainer ring 579. Generally, at initial conditions (full extension of the damper), the secondary spring 578 has significantly more preload force than the main coil-over spring 570. Therefore, during the first portion of damper travel, only the main coil-over spring 570 compresses.

For example, on a damper with a maximum available stroke of 4-inches, the preload on the secondary spring 578 could be such that only the main coil-over spring 570 compresses for the first 2-inches of travel. The spring force supported by the spring support ring 572, would remain constant for the first 2-inches of travel. However, in this example, beyond this point the secondary spring 576 would begin to compress further (both springs compress), and thus the force supported by the spring support ring 572 would increase beyond the first 2-inches of travel. In contrast to the compression damping characteristic described above for the embodiment of FIG. 20B, the embodiment of FIG. 20C produces a characteristic shape as follows: it begins at a level determined by the initial preload of the secondary spring 578. It remains constant at that level ("flat") until the point is reached where the secondary spring 578 begins to compress further, at which point the compression damping force begins to increase linearly with travel.

By extending the general principles illustrated by FIGS. 20A, 20B, and 20C, other possible compression damping force vs. depth of compression stroke characteristics can be achieved.

Figures 22, 23:
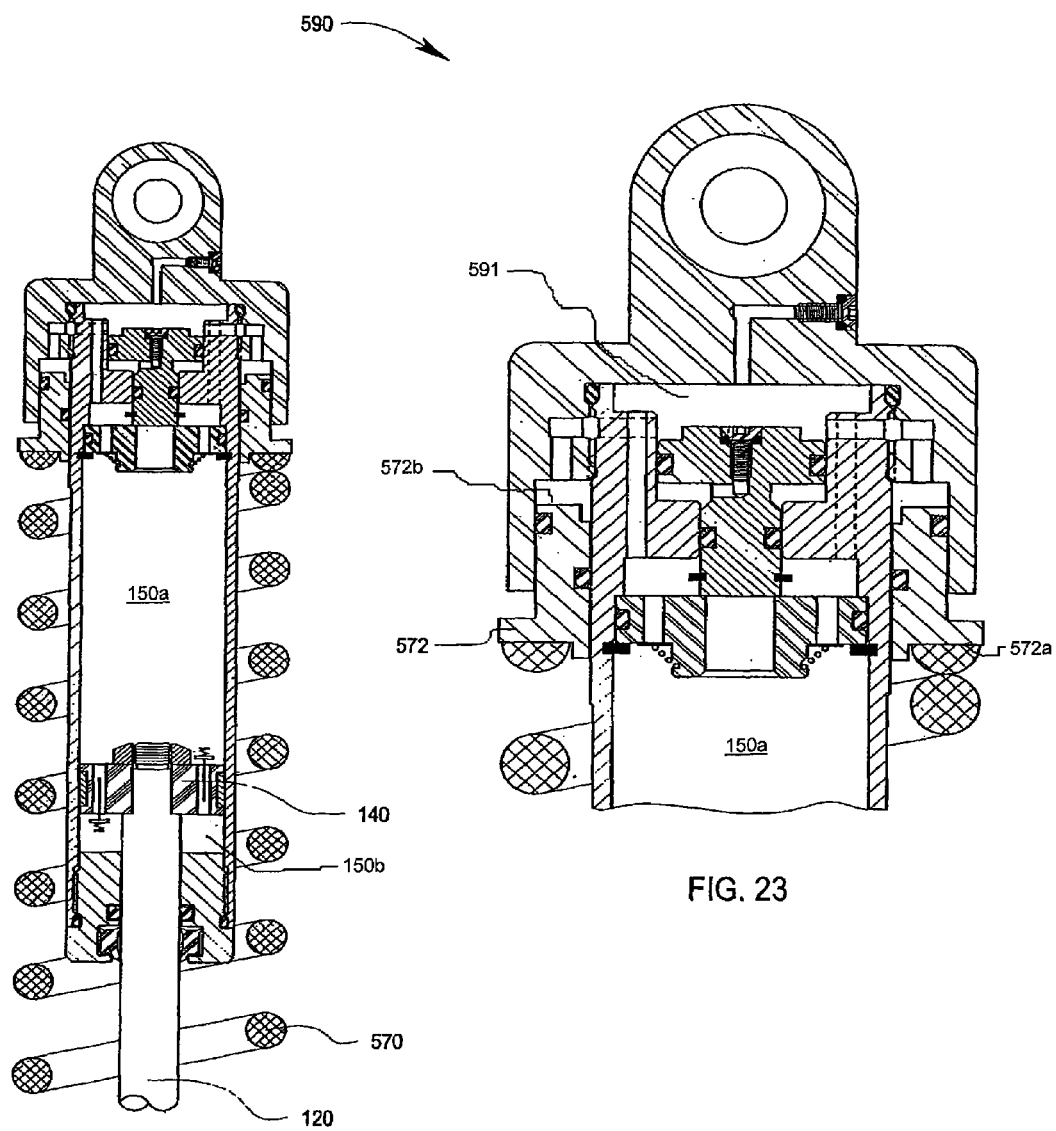
FIG. 22 is a sectional front view of the prior-art damper of FIG. 1, modified in accordance with a ninth exemplary embodiment of the present invention, including elimination of the floating piston.
FIG. 23 is an enlarged partial sectional front view of the damper of FIG. 22, showing the added structure of this embodiment of the present invention.

FIGS. 22 and 23 show another exemplary embodiment of the present invention. This embodiment is similar to the embodiment of FIGS. 20A and 21 except that the floating piston 160 (not included or shown in FIGS. 22 and 23), as utilized in all previous embodiments, has been entirely eliminated. This is feasible with the embodiment of FIGS. 22 and 23, since the compressed force of the coil-over spring 570 acts as a pressure source on the fluid within reservoir chamber 591, within the damper unit similar to that previously provided by the floating piston 160. As in the exemplary embodiments of FIGS. 20A, 20B, and 20C, the compression force of spring 570 is transmitted from the first portion 572a of spring support ring 572 to the second portion 572b of spring support ring 572, thereby producing a pressure in reservoir chamber 560.

In the embodiment of FIGS. 22 and 23, as compared with the embodiment of FIGS. 20A and 21, the same hydraulic fluid is utilized throughout the entire damper unit, including the intensifier assembly 590 portion. Also, since there is no floating piston and no compressible gas (nitrogen) in this embodiment, the fluid volume displaced by the piston rod 120 during a compression stroke must be accommodated by downward movement of the spring support ring 572, thus providing additional annular volume for the displaced fluid.

It should be noted, that this also has the effect of somewhat increasing the "effective spring rate" of the coil-over spring 570. For example, assume a coil-over spring 570 with a spring rate of 300 lbs/in. Also assume that the ratio of the annular area of the spring support ring 572 to the cross-sectional area of the piston rod 120 is 10-to-1. Assume further, for simplicity of this example, that the coil-over spring 570 is not at all compressed (has zero pre-load force) at full extension of the damper. Now assume a compression stroke that shortens the damper exactly 1-inch. Although the damper is only 1-inch shorter, the coil-over spring 570 is now 1.1-inches shorter. This results from the 1-inch damper stroke, plus the 0.1-inch downward movement of the spring support ring 572 to accommodate the fluid volume displaced by the piston rod 120. Thus, the force exerted by the coil-over spring 570 in this position is 330 lbs, and it has an "effective spring rate" of 330 lbs/in.

One advantage of the embodiment of FIGS. 22 and 23 is the complete elimination of the floating piston 160, the internally-pressurized chamber 180, and the Schrader valve 190, as included in all previous embodiments. Another advantage, shared with the embodiment of FIGS. 20A and 21 is the linearly-increasing, position-sensitive compression damping effect produced by the intensifier assembly 590.

Note that, generally, the total compression damping force produced by the embodiment of FIGS. 22 and 23, as well as other embodiments of the present invention, will also include the non-linearly-increasing, non-position-sensitive compression damping forces produced by conventional compression valving at the damping piston 140. Thus, the overall compression damping characteristics will be a combination of those produced at the damping piston 140, plus those produced by the intensifier assembly 590.

Figure 24:
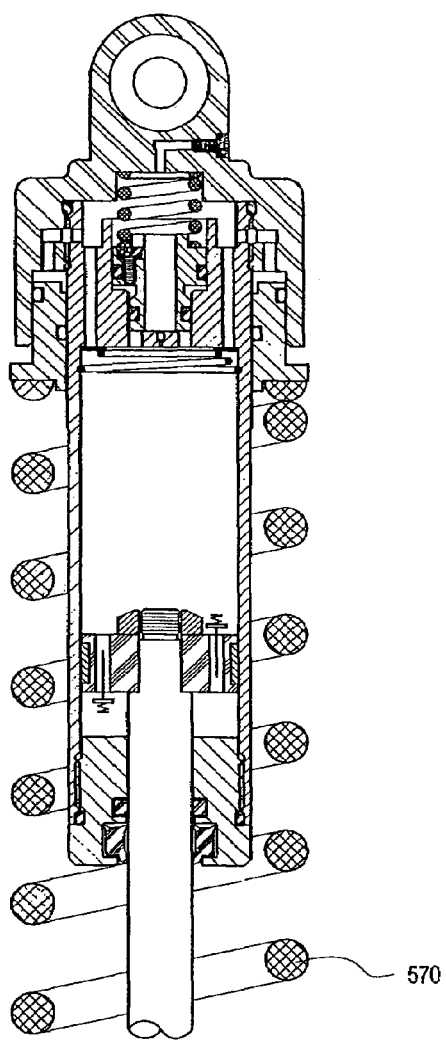
FIG. 24 is a sectional front view of the prior-art damper of FIG. 1, modified in accordance with a tenth exemplary embodiment of the present invention, including elimination of the floating piston and addition of an intensifier preload spring.
Figure 25:
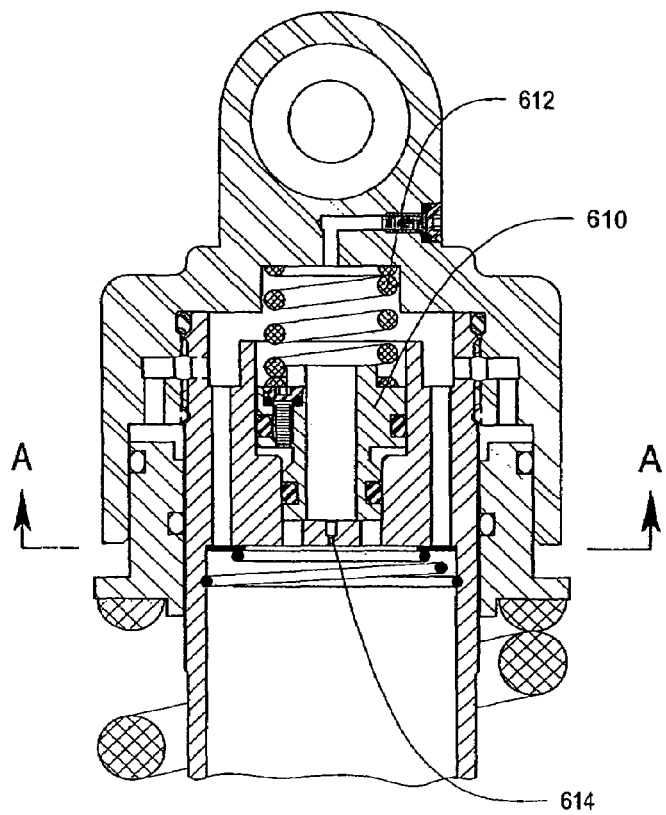
FIG. 25 is an enlarged partial sectional front view of the damper of FIG. 24, showing the added structure of this embodiment of the present invention.
Figure 26:
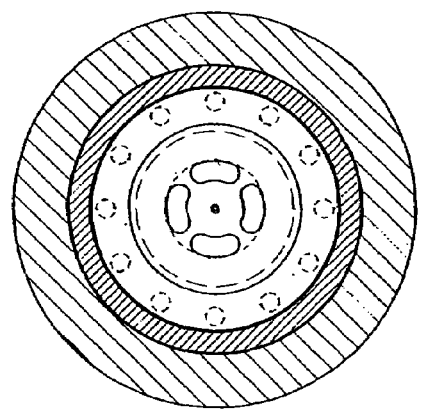
FIG. 26 is a sectional view of the damper of FIG. 25, taken through section A-A of FIG. 25.

FIGS. 24, 25 and 26 show another exemplary embodiment of the present invention. This embodiment is similar to the embodiment of FIGS. 22 and 23 except that an intensifier piston 610 similar to that first shown in FIGS. 4, 5 and 6 is utilized. Another difference is the addition of the intensifier preload spring 612. This enables an increase in the compression damping effect produced by the intensifier piston 610 near full extension, and less relative progressivity throughout the stoke, without requiring an increase in the spring preload of the main coil-over spring 570. An optional small bleed orifice 614, permitting limited fluid flow through the intensifier piston 610 when in a closed condition, thus modifying the operative characteristics of the intensifier assembly, is included. It should be noted that the bleed orifice 614 included here, although not illustrated other embodiments, could also be incorporated in them if desired.

Figure 27:
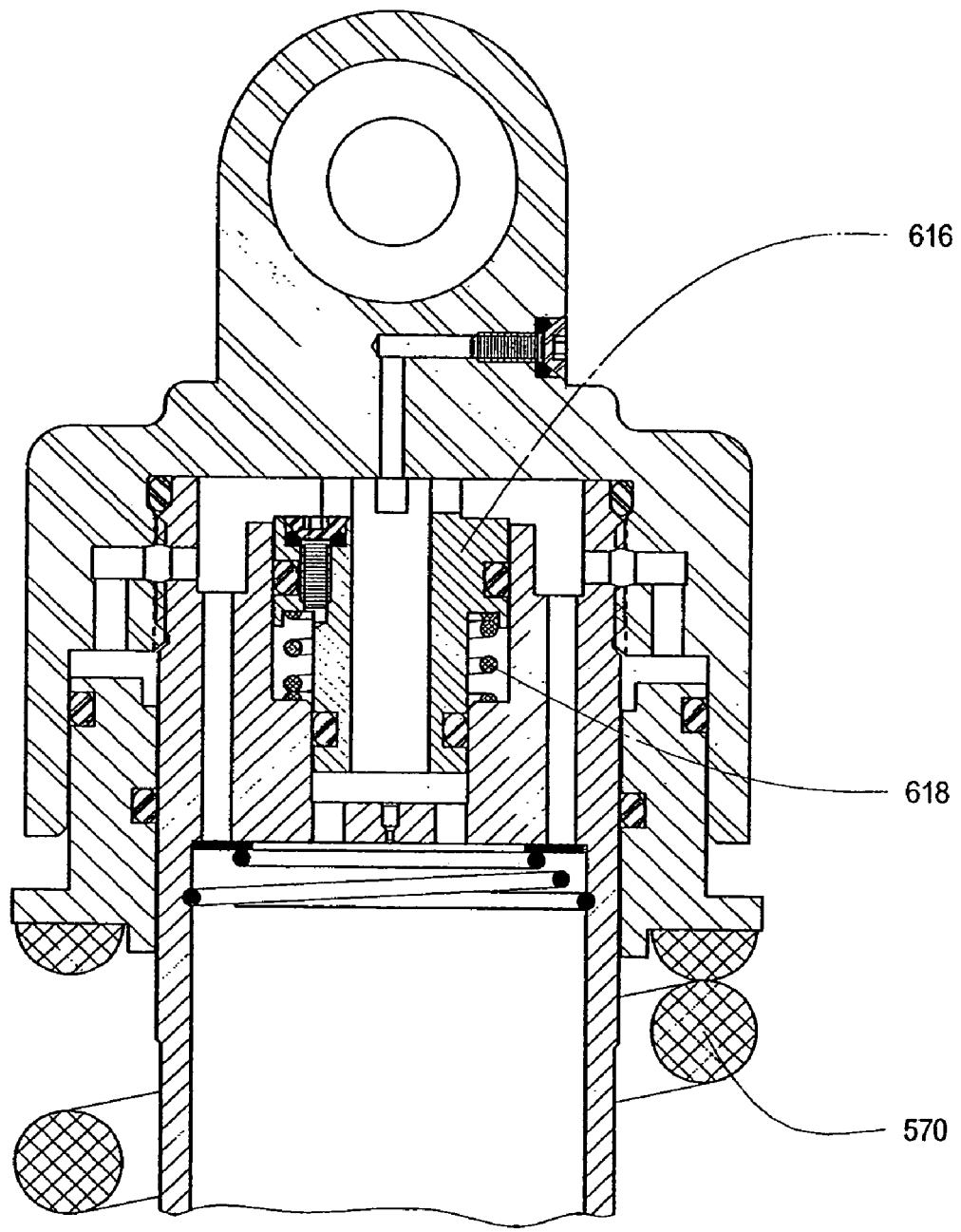
FIG. 27 is an enlarged partial sectional front view of the damper of FIG. 24, modified in accordance with an eleventh exemplary embodiment of the present invention, including elimination of the intensifier preload spring and addition of an intensifier open-bias spring.

FIG. 27 shows another exemplary embodiment of the present invention. This embodiment is similar to the embodiment of FIGS. 24, 25 and 26 except that, rather than the previous intensifier preload spring 612 (as shown in FIG. 25), an intensifier open-bias preload spring 618 is utilized. The effect of the intensifier open-bias preload spring 618 is to maintain the intensifier piston 616 in an open (no flow restriction) position during the early portion (i.e., near-full-extension portion) of a compression stroke. The intensifier piston 616 does not tend to close until a point in the compression stroke is reached where the internal pressure generated by the coil-over spring 570 overpowers the intensifier open-bias preload spring 618. At this point, the intensifier assembly begins to produce a compression damping effect by requiring pressure at the small end of the intensifier piston 616 in order to keep it open.

A characteristic of having no compression damping created by the intensifier at near-full-extension, but with some beginning and increasing intensifier-created compression damping occurring somewhere mid-stroke can be desirable for certain applications.

Note that, by combining the general principles illustrated by FIGS. 20A, 20B, and 20C with those illustrated by FIGS. 25 and 27, a wide variety of possible compression damping force vs. depth of compression stroke characteristics can be achieved.

Figure 28:
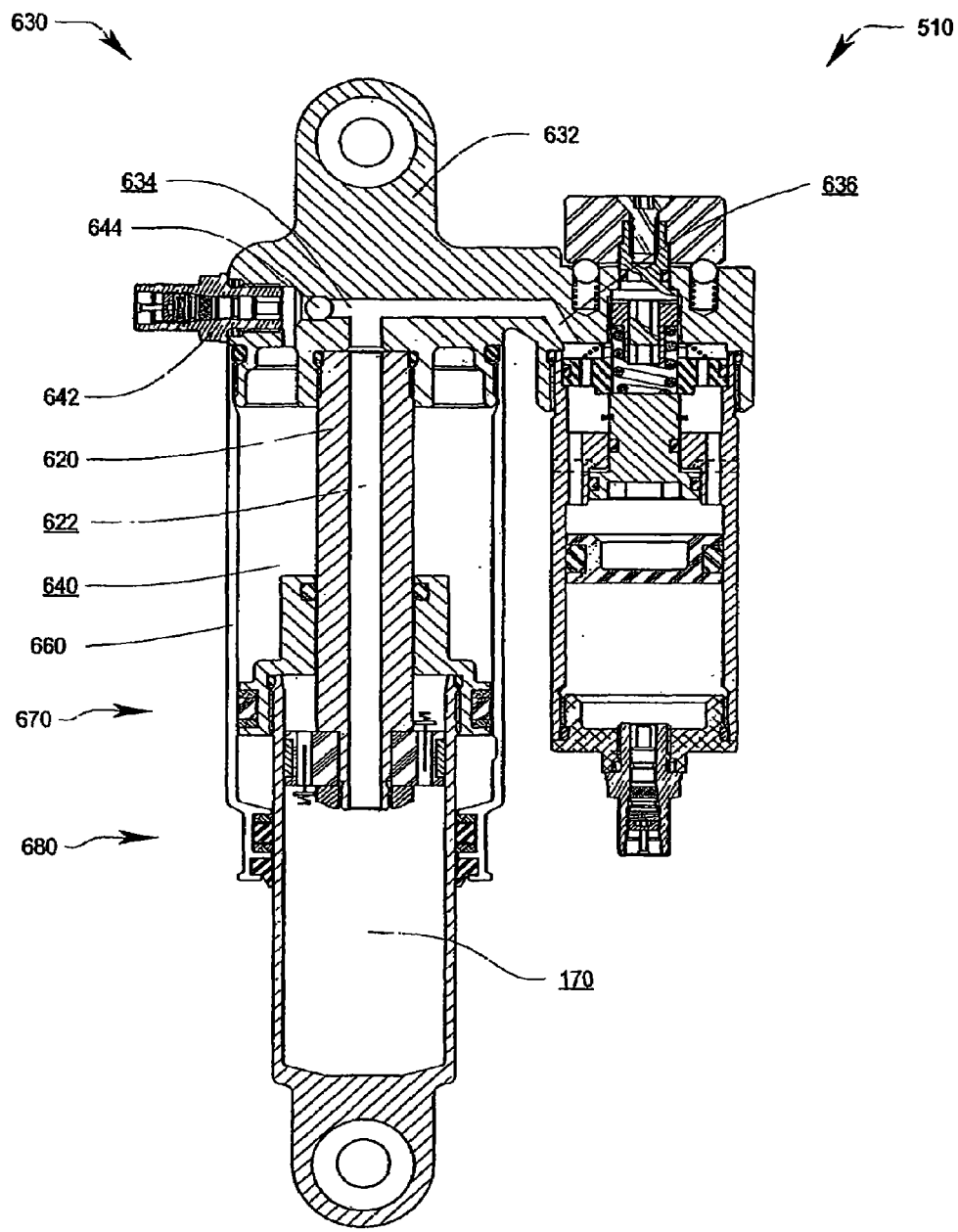
FIG. 28 is a sectional front view of an air-sprung bicycle shock absorber, modified in accordance with a twelfth exemplary embodiment of the present invention.

FIG. 28 shows an exemplary embodiment of the present invention as incorporated into the FLOAT-series of air-sprung dampers as produced by FOX Racing Shox of Watsonville, Calif. In this embodiment, an adjustable intensifier assembly 510 essentially identical to that previously shown in FIG. 17 is attached to the main damper assembly 630 by the piggyback eyelet 632. The pressurized air 640 for the air-sprung feature of the damper is supplied via the Schrader valve 642 as shown.

During a compression stroke of the damper, a volume of hydraulic fluid 170 displaced by the piston rod 620 flows upward via the central port 622 in the piston rod 620, then flows to the right via a horizontal port 634 in the piggyback eyelet 632, then flows downward via an angled port 636 into the intensifier assembly 510. The horizontal port 634 is drilled or otherwise manufactured approximately on-axis with the Schrader valve 642. A press-fit sealing ball 644 is pressed into the entrance of the horizontal port 634 in order to keep the hydraulic fluid 170 and the pressurized air 640 entirely separate.

One advantage of the embodiment of FIG. 28 is that, by providing for flow of the displaced hydraulic fluid up through the piston rod 620 to reach the intensifier assembly 510 via ports in the piggyback eyelet 632 as shown, the pressure chamber sleeve 660 can be easily and conveniently unthreaded and completely removed downward from the overall assembly for the periodic cleaning and maintenance typically required to remove foreign matter which may pass through the dynamic seals during operation and accumulate over time. With a more conventional construction utilizing an attached reservoir at the bottom end of the damper assembly, removal of the pressure chamber sleeve 660 is significantly more difficult, since the pressure chamber sleeve 660 as shown cannot be removed in an upward direction due to interference between the chamber seal assembly 670 and the outer seal assembly 680 portion of the pressure chamber sleeve 660. Thus, additional disassembly, or added complexity of construction, would be required to enable removal of the pressure chamber sleeve 660 if the reservoir was attached at the bottom end of the damper assembly.

Figure 29:
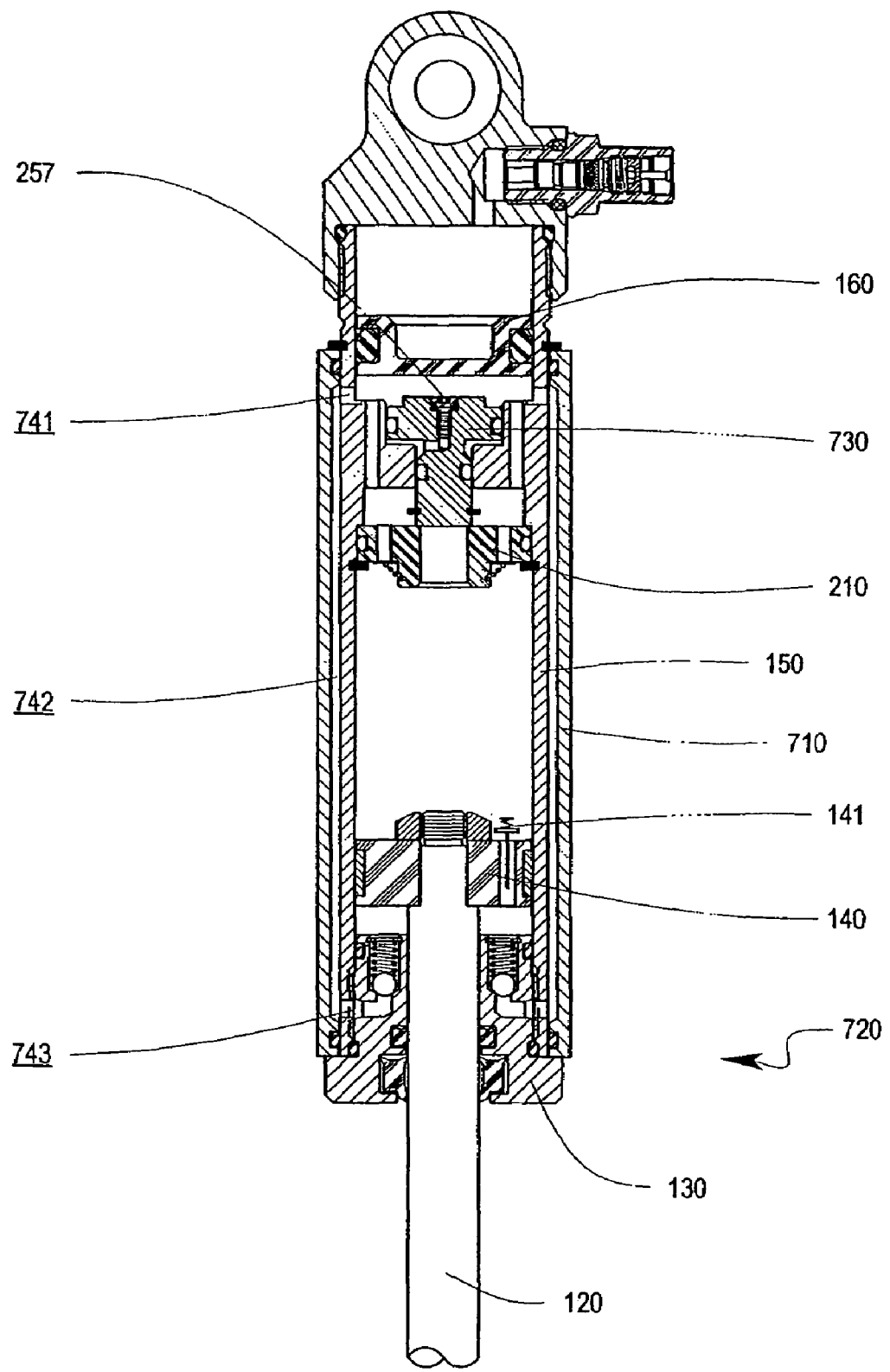
FIG. 29 is a sectional front view of the prior-art damper of FIG. 1, modified in accordance with a thirteenth exemplary embodiment of the present invention.

FIG. 29 shows another exemplary embodiment of the present invention. Two of the unique features of this embodiment, as compared with all previously shown embodiments, are the outer sleeve 710, and the seal head check valve assembly 720. A third differentiating feature is the lack of compression valving (symbolic) 142 (not included or shown in FIG. 29) as shown and identified in FIG. 1, and as illustrated in all previous embodiments. The partition 210 and the intensifier piston 730 are similar to those previously shown and described per FIGS. 2 and 3, except for the addition of a bleed screw 257 in the intensifier piston 730 for purposes as first previously described relative to FIGS. 4 and 5. This feature is important for the embodiment of FIG. 29, since a vent port 270 (not shown or included in FIG. 29) feature such as shown in FIGS. 2 and 3 would be difficult to achieve due to the added outer sleeve 710 of FIG. 29.

A primary advantage of the embodiment of FIG. 29 is that, since the damping piston 140 has no compression ports or valves, no hydraulic fluid flows through the damping piston 140 during a compression stroke. Therefore, the displaced fluid volume during a compression stroke is determined by the full cross-sectional area of the damping piston 140, rather than by the much smaller cross-sectional area of the piston rod 120, as in previous embodiments. One portion of the displaced fluid, a portion equal to the displaced volume of the piston rod 120, is accommodated by upward movement of the floating piston 160. The other portion exits the damper cylinder 150 via the upper flow port(s) 741, then travels downward via the annular space 742 between the damper cylinder 150 and the outer sleeve 710, then re-enters the damper cylinder 150 via the lower flow port(s) 743, which lead to the check valve assembly 720 in the seal head 130. The check valve assembly 720 opens for flow in the upward direction, allowing the fluid flow to continue and to fill the vacated annular space behind the damping piston 140 during a compression stroke. Since there is no flow through the damping piston 140 during a compression stroke, the pressure generated by the intensifier piston 730 acts on the full cross-sectional area of the damping piston 140. Thus, relatively large compression damping forces can be produced with this embodiment at significantly lower internal pressures than in previous embodiments.

In FIG. 29, the check valve assembly 720 permits fluid flow in the upward direction only. Thus, during a rebound stroke, the check valve assembly 720 is closed, and the fluid pressure created between the damping piston 140 and the seal head 130 cannot escape through the seal head 130. Therefore, the desired rebound damping forces are created by the damping piston 140 and the rebound valving 141.

Figure 31:
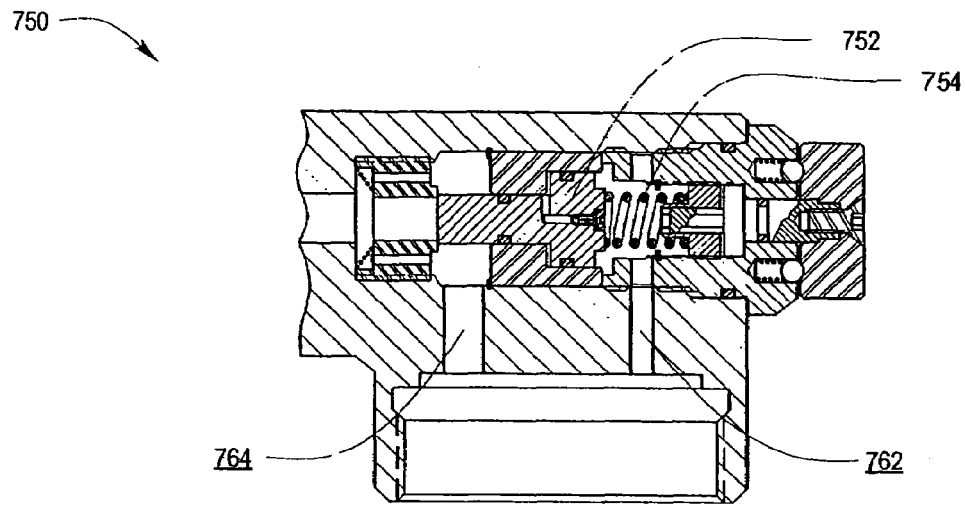
FIG. 31 is an enlarged partial sectional front view of the damper of FIG. 30, showing the specific structure of this embodiment of the present invention.
Figure 30:
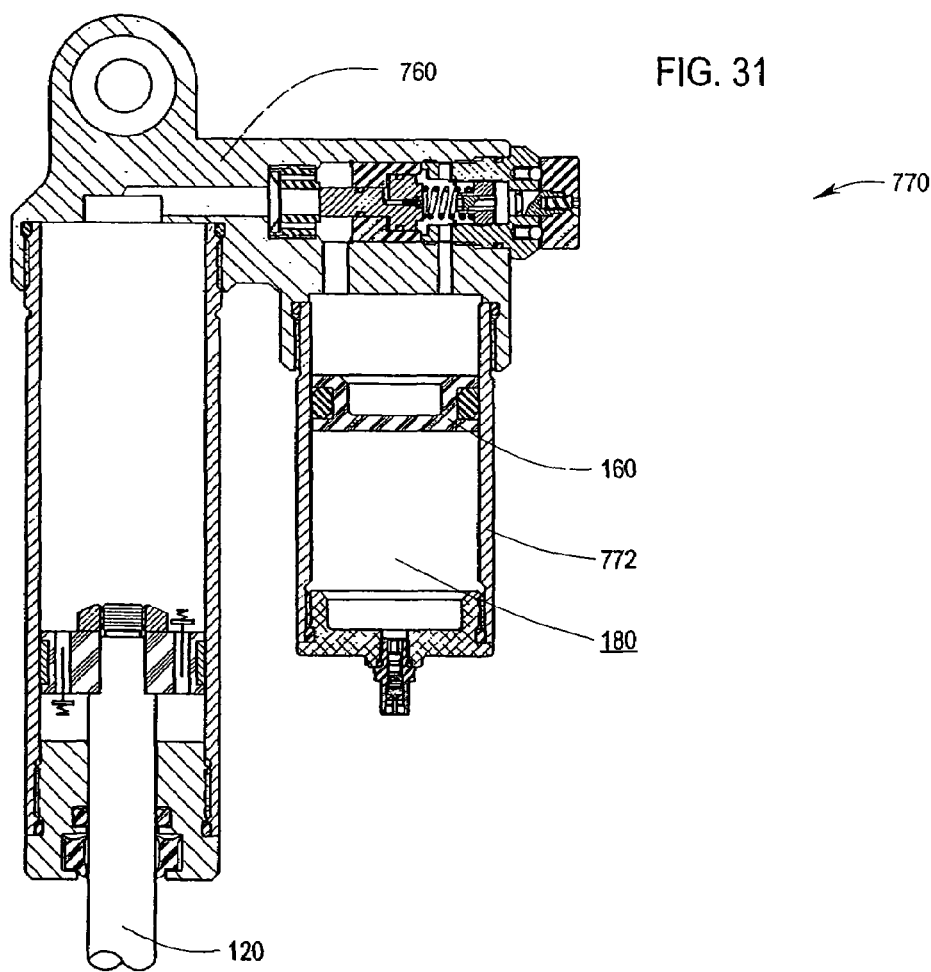
FIG. 30 a sectional front view of the prior-art damper of FIG. 1 modified in accordance with a fourteenth exemplary embodiment of the present invention.

FIGS. 30 and 31 show another exemplary embodiment of the present invention. This embodiment is somewhat similar to the previous embodiment shown in FIGS. 16 and 17, except that the intensifier assembly 750 is oriented horizontally within the piggyback eyelet 760 structure leading to the reservoir assembly 770. Besides the different location, the other key difference relative to the embodiment of FIGS. 16 and 17 is that here the intensifier adjuster spring 754 engages the large end of the intensifier piston 752, rather than the small end. The net effect of this is that, in FIGS. 30 and 31, an adjustment that increases the preload force on the intensifier adjuster spring 754 increases the compression damping force produced by the intensifier assembly 750. In contrast, in FIGS. 16 and 17, an adjustment that increases the preload force of the intensifier adjuster spring 520 decreases the compression damping force produced. There is no particular advantage or disadvantage to either construction; the differences are simply pointed out here for clarity.

In the embodiment of FIGS. 30 and 31, the pressure from the internally-pressurized chamber 180 below the floating piston 160 reaches the large end of the intensifier piston 752 via a pressure port 762 in the piggyback eyelet 760. Fluid flow due to displacement of the piston rod 120 during compression and rebound strokes flows into and out of the upper portion of the reservoir cylinder 772 via the flow port 764.

Figure 33:
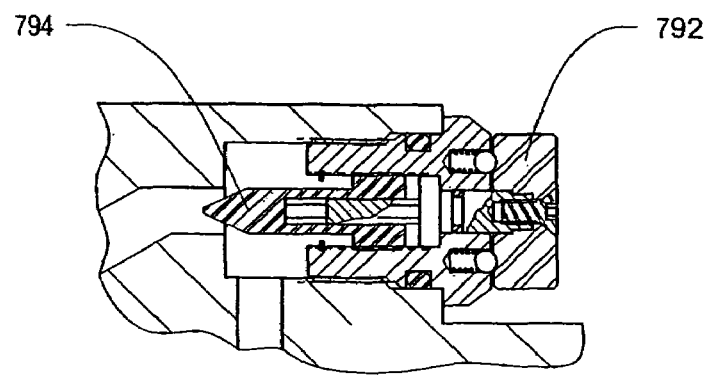
FIG. 33 is an enlarged partial sectional front view of the damper of FIG. 32, showing the specific structure added to this embodiment of the present invention.
Figure 32:
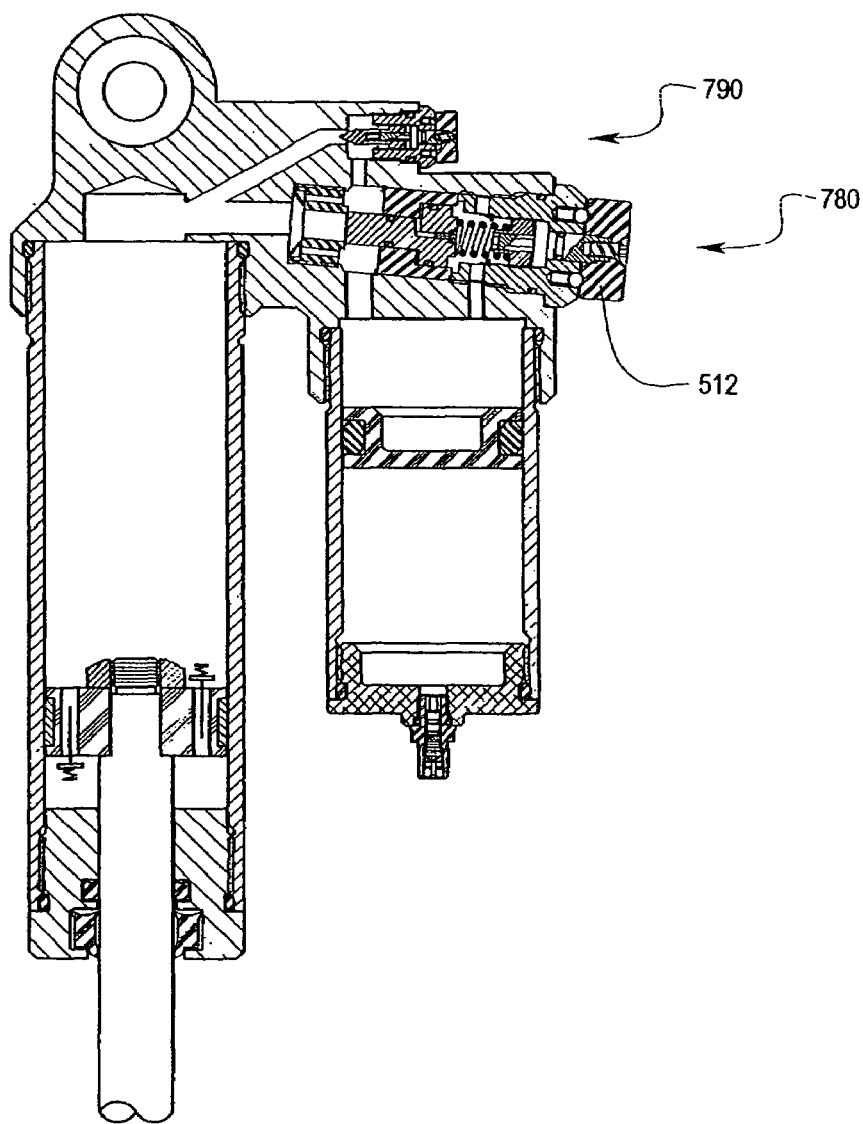
FIG. 32 is a sectional front view of a modified version of the damper of FIG. 30, incorporating a fifteenth exemplary embodiment of the present invention.

FIGS. 32 and 33 show another exemplary embodiment of the present invention. This embodiment differs from the previous embodiment of FIGS. 30 and 31 in two basic respects. First, the intensifier assembly 780, rather than being oriented horizontally as in the previous embodiment, is oriented at a small angle from horizontal. This provides no significant performance benefits, but is shown simply as an illustration of one of the configuration possibilities available with this embodiment which may offer easier access to the intensifier adjuster knob 512 for making adjustments to the damper as installed in a particular application.

Secondly, the embodiment of FIGS. 32 and 33 differs from the previous embodiment of FIGS. 30 and 31 by the addition of the compression flow bleed adjuster assembly 790. The basic mechanism of this assembly, whereby rotation of the bleed adjuster knob 792 produces translation of the tapered bleed adjuster needle 794, is similar to the mechanism utilized in the adjustable intensifier assembly 510, as best seen and described previously relative to FIG. 17. The compression flow bleed adjuster assembly 790 provides independent tuning of compression bleed flow of the damper. This can be an important tuning element in many damper applications. Compression bleed flow occurs in parallel with any compression flow through the intensifier assembly 780.

Figure 34:
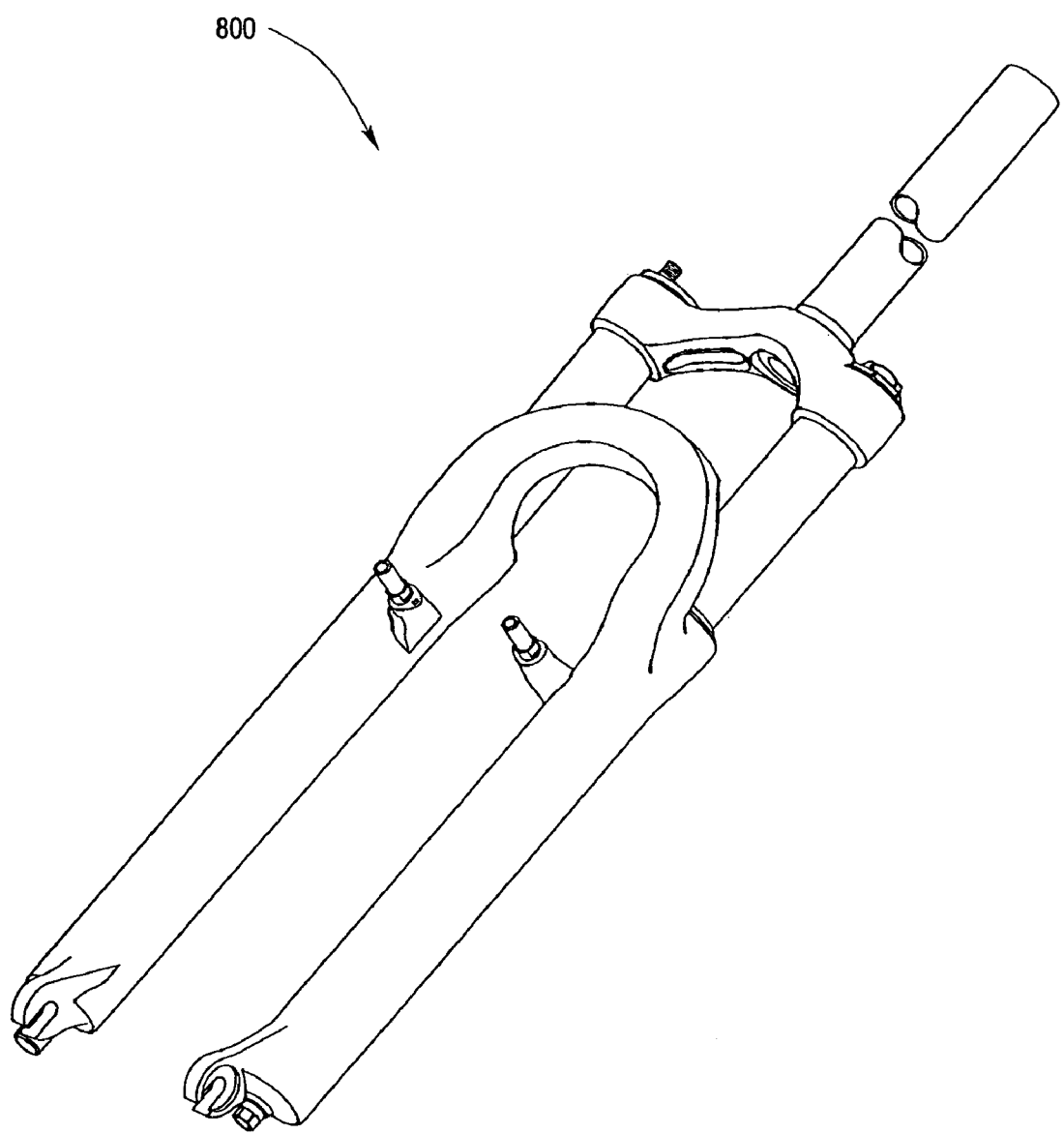
FIG. 34 is an overall perspective view of the front fork of a bicycle.
Figure 35:
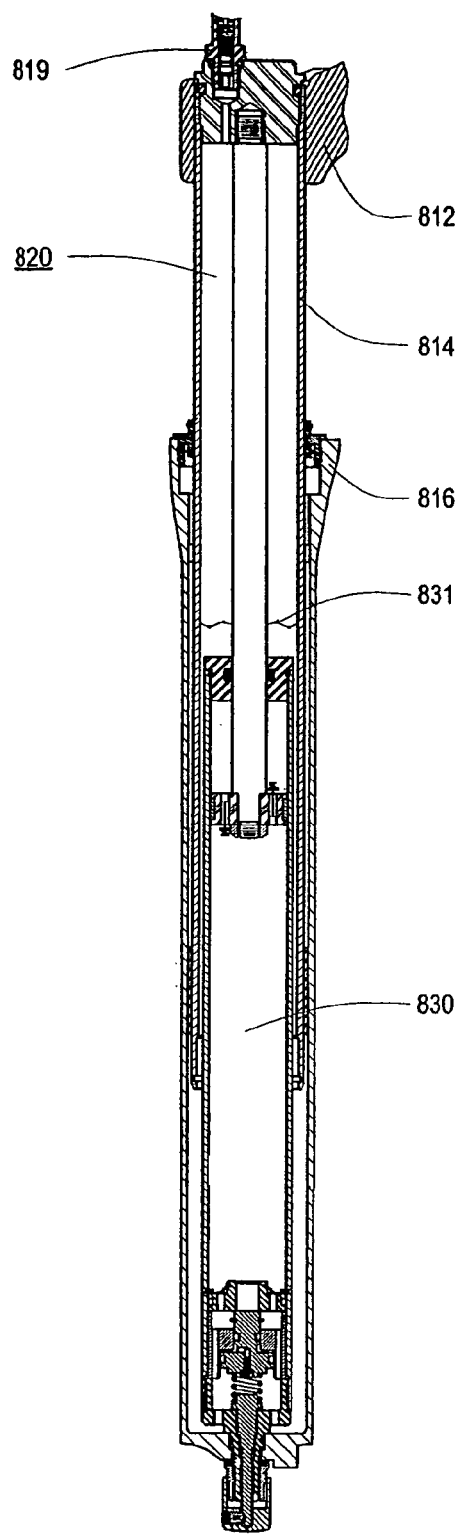
FIG. 35 is an overall sectional front view of one leg of the fork of FIG. 34, incorporating a sixteenth exemplary embodiment of the present invention.
Figure 36:
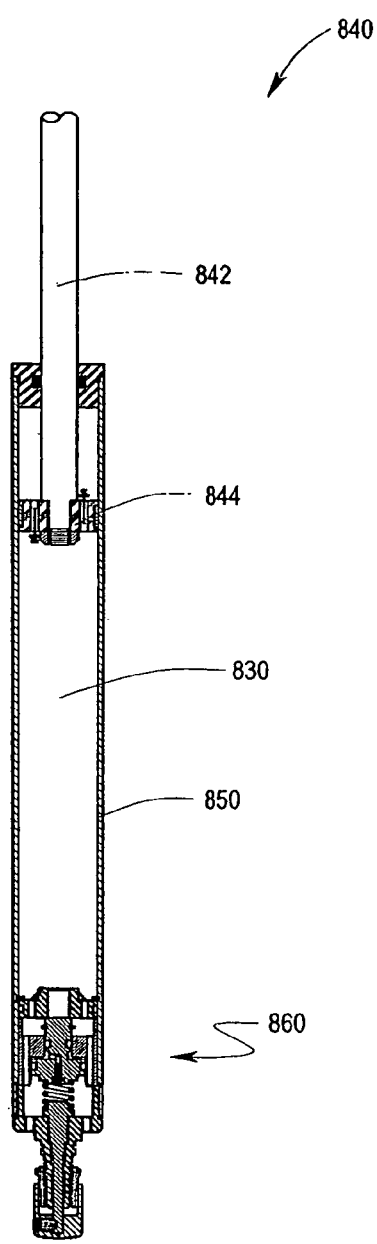
FIG. 36 is a sectional front view of the damper assembly of the fork leg of FIG. 35.
Figure 37:
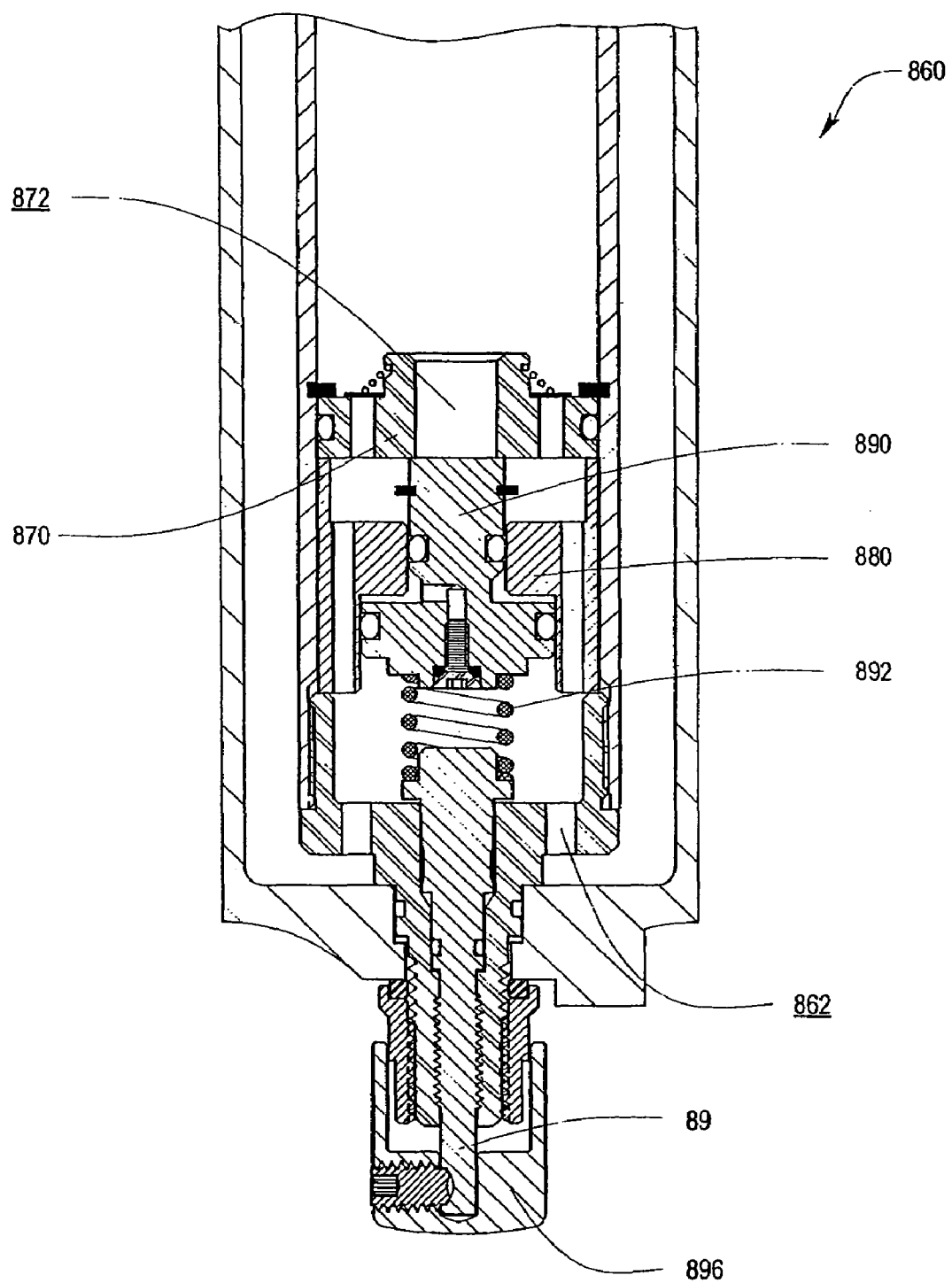
FIG. 37 is an enlarged partial sectional front view of the damper of FIG. 36, showing the specific structure of this embodiment of the present invention.

FIG. 34 shows an overall view of a front suspension fork 800 which, as is known in the art, could be used on a bicycle or motorcycle (not shown). Individual components of the suspension fork 800 are not numbered or described relative to FIG. 34, since this general construction is well-known in the art (see e.g. our U.S. Pat. No. 6,592,136). FIGS. 35, 36, and 37 show an exemplary embodiment of the present invention as incorporated into the suspension fork 800 of FIG. 34.

FIGS. 35 and 36 show a fork leg assembly 810, in part comprised of a fork crown (partial view) 812, a fork upper tube 814, a fork lower tube 816, a Schrader valve 819, air 820, and hydraulic fluid 830 filled to an approximate level 831 as shown. In addition, the fork leg assembly 810 comprises a damper assembly 840 as shown in isolation in FIG. 36. The upper portion of the damper assembly 840 shown in FIG. 36 includes a piston rod 842, a damping piston 844, a damper cylinder 850 and hydraulic fluid 830, a construction known in the art of conventional fork damper assemblies and sometimes referred to as a damper cartridge assembly.

An intensifier assembly 860 in the lower portion of the damper assembly 840 shown in FIG. 36 comprises an exemplary embodiment of the present invention, and is best seen in FIG. 37.

FIG. 37 shows the intensifier assembly 860 which includes a partition 870, an intensifier housing 880, an intensifier piston 890, an intensifier preload spring 892, an adjuster rod 894, and an adjuster knob 896.

The principles of operation of the intensifier assembly 860 of FIG. 37 are similar to those previously shown and described for previous embodiments. During a compression stroke of the suspension fork 800, the piston rod 842 displaces a volume of the hydraulic fluid 830 in the damper cylinder 850. In order for the compression stroke to occur, the displaced fluid must exit the damper assembly. For the structure shown in FIG. 37, this can only occur when the pressure in the hydraulic fluid 830 above the partition 870, acting on the area of the small end of the intensifier piston 890, overcomes the upward forces acting on the intensifier piston 890, thus causing the intensifier piston 890 to move downward, allowing downward fluid flow through the compression flow port 872.

There are two upward forces acting on the intensifier piston 890. First, there is the upward force applied by the intensifier preload spring 892. Second, there is the internal pressure in the air 820, which is communicated by the hydraulic fluid exterior to the damper cylinder 850 up through the bottom of the intensifier assembly 860 via the lower bi-directional flow port(s) 862, and which acts on the cross-sectional area of the large end of the intensifier piston 890 to produce the second upward force.

Thus, identical in principle to previously-described embodiments of the present invention, a relatively large hydraulic fluid pressure increase is created by the adjustable intensifier assembly 860 during a compression stroke. This pressure increase, acting on the cross-sectional area of the piston rod 842 produces a compression damping force in the suspension fork 800.

The fork leg assembly 810 of FIG. 35 can be assembled with a desired volume of air 820 at atmospheric pressure, or it can be supplied with pressurized air (or other compressible gas, such as nitrogen) via a Schrader valve 819. In either case, as a compression stroke of the suspension fork 800 proceeds, the volume of the air 820 in the fork leg assembly 810 is progressively reduced (compressed), resulting in a progressively-increasing internal pressure. This increasing internal air pressure, acting through the intensifier assembly 860, produces a progressive increase in the compression damping force of the suspension fork 800. Thus, a progressive, position-sensitive compression damping force, as it is known in the art, is produced.

However, it should be noted again that, similar to descriptions regarding previous embodiments of the present invention, compression damping forces in the suspension fork 800 are generally also produced at the damper piston 844. Thus, in general, the total compression damping characteristics produced by various embodiments of the present invention result from a combination of the compression damping forces created by valving at the damper piston (for example, 844 in FIG. 36) plus the compression damping forces resulting from pressure increases produced by the intensifier assembly (for example, 860 in FIG. 36) acting on the cross-sectional area of the piston rod (for example, 842 in FIG. 36).

Although the present invention has been explained in the context of several exemplary embodiments, minor modifications and rearrangements of the illustrated embodiments may be made without departing from the scope of the invention. For example, but without limitation, although the exemplary embodiments described intensifier pistons with bleed or vent provisions to eliminate pressure in the space between the small and large ends of the intensifier pistons, the principles taught may also be utilized in damper embodiments without these provisions. In addition, although the exemplary embodiments were described in the context of vehicular applications, the present damper may be modified for use in non-vehicular applications where dampers may be utilized. Furthermore, it is contemplated that various aspects and features of the invention described can be practiced separately, combined together, or substituted for one another, and that a variety of combination and subcombinations of the features and aspects can be made and still fall within the scope of the invention. Accordingly, the scope of the present invention is to be defined only by the appended claims.

What is claimed is:

1. A pressure-sensitive suspension assembly, comprising:
a damper body having a longitudinal axis and at least partially defining a fluid chamber containing damping fluid;
a piston rod, a portion of the piston rod movable along the longitudinal axis of, and within, the damper body, wherein during a compression stroke, portions of the piston rod move further into the damper body;
a pressure-sensitive compression control valve assembly comprising:
  a) a partition separating the fluid chamber into a compression chamber and a reservoir chamber, the partition having at least one compression flow port, wherein during a compression stroke, the piston rod expels damping fluid from the compression chamber to the reservoir chamber through the at least one compression flow port;
  b) an intensifier piston, the intensifier piston having a first cross-sectional area and a second cross-sectional area, the second cross-sectional area being larger than the first cross-sectional area, and:
    i) the first cross-sectional area engaging the compression flow port to restrict compression fluid flow through the compression flow port and from the compression chamber to the reservoir chamber; and
    ii) the second cross-sectional area being acted upon by the pressure of the fluid contained within the reservoir chamber;
at least one partially compressed spring assembly associated with the suspension assembly;
at least one movable element associated with the suspension assembly, the at least one movable element having:
  a) a first portion having the compression force of the at least one spring assembly transmitted thereto; and
  b) a second portion contacting the fluid in the reservoir chamber, whereby the amount of force transmitted to the first portion of the movable element by the spring assembly is at least partially converted to a fluid pressure in the reservoir chamber by the second portion of the movable element; and
whereby the resistance to fluid flow through the pressure-sensitive compression control valve is at least partially determined by the fluid pressure in the reservoir chamber.

2. The suspension assembly of claim 1, wherein:
a) the spring assembly includes a coil spring substantially coaxial with and surrounding a portion of the suspension assembly; and
b) the movable element comprises a spring support having a portion forming a movable sealed end to the reservoir chamber.

3. The suspension assembly of claim 1, wherein a portion of the reservoir chamber is annular and at least partially surrounds the damper body.

4. The suspension assembly of claim 1, wherein the partition is fixed within the damper body.

5. The suspension assembly of claim 1, further comprising a piston coupled to the piston rod, the piston dividing the fluid chamber of the damper body into a variable volume rebound chamber and a variable volume compression chamber.

6. The suspension assembly of claim 1, wherein the first and second cross-sectional areas of the intensifier piston are sealed from each other such that the pressures communicated to the first and second cross-sectional areas of the intensifier piston may be different.

7. A suspension assembly, comprising:
a damper body having a longitudinal axis and at least partially defining a compression chamber containing a damping fluid;
a piston rod, a portion of the piston rod movable along the longitudinal axis of, and within, the damper body, wherein during a compression stroke, portions of the piston rod move further into the damper body;
a partition separating the compression chamber from a variable volume reservoir chamber;
at least one flow control valve for controlling damping fluid flow out of the compression chamber and into the variable volume reservoir chamber;
at least one partially compressed suspension spring associated with the suspension assembly;
at least one movable element, the at least one movable element having a first portion contacting the partially compressed suspension spring and a second portion contacting the pressure of the fluid in the reservoir chamber, whereby the second portion of the movable element forms a movable sealed end of the variable volume reservoir chamber such that the amount of force transmitted to the first portion of the movable element by the spring assembly is at least partially converted to a fluid pressure in the reservoir chamber by the second portion of the movable element;

wherein damping fluid flows out of the compression chamber and into the variable volume reservoir chamber as the piston rod moves further into the damper body, thereby displacing the at least one movable element and, increasing the fluid pressure in the variable volume reservoir chamber.

8. The suspension assembly of claim 7, wherein the suspension spring associated with the suspension assembly comprises a coil spring substantially coaxial with and surrounding a portion of the damper body.

9. The suspension assembly of claim 7, wherein the at least one flow control valve comprises a pressure-sensitive compression control valve and wherein damping fluid flow through the at least one flow control valve is at least partially determined by the pressure of the damping fluid in the reservoir chamber.

10. The suspension assembly of claim 7, wherein a portion of the reservoir chamber is annular and at least partially surrounds a portion of the damper body.

11. A suspension assembly, comprising:
a housing partially bounding a fluid chamber filled with liquid, the fluid chamber having a volume which varies during operation;
a partition dividing the fluid chamber into a first chamber and a second chamber;
a piston rod having a first end positioned within the first chamber through a sealed opening and a second end positioned outside of the fluid chamber;
at least one port in the partition through which a portion of the liquid, displaced by the entrance into the first chamber of successive portions of the piston rod during a compression stroke, flows in a first direction from the first chamber to the second chamber, thereby increasing the volume of the second chamber;
a valve in engagement with the at least one port, the valve generating resistance to flow of the fluid in the first direction through the at least one port;
a suspension spring associated with the suspension assembly, the suspension spring producing a force tending to retract the piston rod and extend the suspension assembly;
a movable spring support having a first portion carrying the force produced by the suspension spring, and an opposing second portion in sealed communication with the second chamber and bounding a variable portion of the second chamber, the spring support configured to:
 a) produce a pressure within the second chamber, the pressure being at least partially determined by the suspension spring force; and
 b) move so as to increase the volume of the second chamber in response to the piston rod advancing further into the first chamber, where the amount of movement of the spring support has a constant, predetermined relationship with the amount of movement of the piston rod.

12. The suspension assembly of claim 11 wherein the housing is a cylinder having a bore with a longitudinal axis.

13. The suspension assembly of claim 11 wherein the liquid is a hydraulic damping fluid.

14. The suspension assembly of claim 11 wherein the suspension spring is a coil spring.

15. The suspension assembly of claim 14 wherein the coil spring at least partially surrounds the housing.

16. The suspension assembly of claim 11 wherein the spring support is an annular ring, the annular ring surrounding a portion of the housing.

17. The suspension assembly of claim 11 wherein the pressure produced by the spring support is directly proportional to the amount of suspension spring force.

18. A suspension assembly, comprising:
a housing partially bounding a fluid chamber filled with liquid, the fluid chamber having a volume which varies during operation;
a partition dividing the fluid chamber into a first chamber and a second chamber;
a piston rod having a first end positioned within the first chamber through a sealed opening and a second end positioned outside of the fluid chamber;
at least one port in the partition through which a portion of the liquid, displaced by the entrance into the first chamber of successive portions of the piston rod during a compression stroke, flows in a first direction from the first chamber to the second chamber, thereby increasing the volume of the second chamber;
a suspension spring associated with the suspension assembly, the suspension spring producing a force tending to retract the piston rod and extend the suspension assembly;
a movable spring support having a first portion carrying the force produced by the suspension spring, and an opposing second portion in sealed communication with the second chamber and bounding a variable portion of the second chamber, the spring support configured to:
 a) produce a pressure within the second chamber, the pressure being at least partially determined by the suspension spring force; and
 b) move so as to increase the volume of the second chamber in response to the piston rod advancing further into the first chamber;
a valve in engagement with the at least one port, the valve generating resistance to flow of the fluid in the first direction through the at least one port, the resistance varying according to the amount of force communicated to the valve by the pressure in the second chamber.

19. The suspension assembly of claim 18 wherein the housing is a cylinder having a bore with a longitudinal axis.

20. The suspension assembly of claim 18 wherein the liquid is a hydraulic damping fluid.

21. The suspension assembly of claim 18 wherein the suspension spring is a coil spring.

22. The suspension assembly of claim 21 wherein the coil spring at least partially surrounds the housing.

23. The suspension assembly of claim 18 wherein the spring support is an annular ring, the annular ring surrounding a portion of the housing.

24. The suspension assembly of claim 18 wherein the pressure produced by the spring support is directly proportional to the amount of suspension spring force.

25. The suspension assembly of claim 18 wherein the valve is a pressure intensifier.

* * * * *